(12) United States Patent
Sharkawy et al.

(10) Patent No.: US 9,817,296 B2
(45) Date of Patent: Nov. 14, 2017

(54) OPTICAL ROUTER HAVING OPTICAL ROUTING NODES OF FOUR BI-DIRECTIONAL OPTICAL SWITCHES

(71) Applicant: LUMILANT, INC., Newark, DE (US)

(72) Inventors: Ahmed Sharkawy, Newark, NJ (US); Dennis W. Prather, Newark, DE (US); Mathew Joseph Zablocki, Newark, DE (US)

(73) Assignee: LUMILANT, INC., Newark, DE (US)

( * ) Notice: Subject to any disclaimer, the term of this patent is extended or adjusted under 35 U.S.C. 154(b) by 0 days.

(21) Appl. No.: 15/279,459

(22) Filed: Sep. 29, 2016

(65) Prior Publication Data

US 2017/0082908 A1    Mar. 23, 2017

Related U.S. Application Data

(60) Division of application No. 13/040,826, filed on Mar. 4, 2011, now Pat. No. 9,459,404, which is a
(Continued)

(51) Int. Cl.
*G02F 1/313*    (2006.01)
*B82Y 20/00*    (2011.01)
(Continued)

(52) U.S. Cl.
CPC ............ *G02F 1/3133* (2013.01); *B82Y 20/00* (2013.01); *G02B 6/125* (2013.01); *G02B 6/1225* (2013.01);
(Continued)

(58) Field of Classification Search
CPC ...... B82Y 20/00; G02B 6/122; G02B 6/1225; G02B 6/125; G02F 1/015; G02F 1/025; G02F 1/31; G02F 1/313; G02F 1/3133; G02F 1/3134; G02F 1/3138; G02F 2001/0152; G02F 2001/311; G02F 2202/105; G02F 2202/32; H04B 10/25;
(Continued)

(56) References Cited

U.S. PATENT DOCUMENTS 6,542,682 B2    4/2003  Cotteverte et al.
6,640,023 B2 *  10/2003  Miller ................ H04Q 11/0005
                                                     385/16
(Continued)

*Primary Examiner* — Andrew Jordan
(74) *Attorney, Agent, or Firm* — Muir Patent Law, PLLC

(57) ABSTRACT

An optical routing element may include a planar dielectric photonic crystal which includes a lattice of holes having a first linear defect adjacent a second linear defect, with the two defects being separated by a central row of lattice holes. The first linear defect in the lattice of holes may form a first single mode line defect waveguide, and the second linear defect in the lattice of holes may form a second single mode line defect waveguide. Optical energy may be selectively coupled between the first and second waveguides across the central row of lattice holes. A free-carrier injector may be included to inject free-carriers into the dielectric photonic crystal, activation of which may alter selectivity of the optical coupling between the first and second waveguides. A plurality of optical routing elements with associated free-carrier injectors may be interconnected to form a bi-directional optical routing array.

44 Claims, 34 Drawing Sheets

Related U.S. Application Data continuation-in-part of application No. 12/910,198, filed on Oct. 22, 2010, now abandoned.

(60) Provisional application No. 61/272,706, filed on Oct. 23, 2009.

(51) Int. Cl.
| | |
|---|---|
| *G02B 6/122* | (2006.01) |
| *G02B 6/125* | (2006.01) |
| *G02F 1/025* | (2006.01) |
| *H04B 10/25* | (2013.01) |
| *H04Q 11/00* | (2006.01) |
| *H04J 14/02* | (2006.01) |
| *G02F 1/015* | (2006.01) |
| *G02F 1/31* | (2006.01) |

(52) U.S. Cl.
CPC ............ *G02F 1/025* (2013.01); *G02F 1/3134* (2013.01); *G02F 1/3138* (2013.01); *H04B 10/2503* (2013.01); *H04Q 11/0005* (2013.01); *G02F 2001/0152* (2013.01); *G02F 2001/311* (2013.01); *G02F 2202/105* (2013.01); *G02F 2202/32* (2013.01); *H04J 14/021* (2013.01); *H04J 14/0208* (2013.01); *H04J 14/0212* (2013.01); *H04J 14/0216* (2013.01); *H04J 14/0217* (2013.01); *H04Q 2011/0052* (2013.01); *H04Q 2011/0058* (2013.01)

(58) Field of Classification Search
CPC .. H04B 10/2503; H04J 14/02; H04J 14/0208; H04J 14/021; H04J 14/0212; H04J 14/0216

See application file for complete search history.

(56) References Cited

U.S. PATENT DOCUMENTS

| | | | |
|---|---|---|---|
| 7,149,427 | B1 | 12/2006 | Dewa et al. |
| 7,428,348 | B2 | 9/2008 | Prather et al. |
| 7,440,658 | B2 | 10/2008 | Furuya et al. |
| 8,829,638 | B2 | 9/2014 | Shambat et al. |
| 9,459,404 | B2* | 10/2016 | Sharkawy .............. B82Y 20/00 |
| 2001/0026668 | A1 | 10/2001 | Yamada |
| 2002/0021878 | A1 | 2/2002 | Allan et al. |
| 2002/0054405 | A1* | 5/2002 | Guo .................... H04J 14/0227 398/45 |
| 2003/0011775 | A1 | 1/2003 | Soljacic et al. |
| 2003/0059153 | A1* | 3/2003 | Miller ................ H04Q 11/0005 385/17 |
| 2004/0001683 | A1 | 1/2004 | Lau et al. |
| 2005/0147339 | A1 | 7/2005 | Prather et al. |
| 2005/0152649 | A1 | 7/2005 | Benisty et al. |
| 2006/0204173 | A1 | 9/2006 | Suzuki et al. |
| 2007/0160336 | A1 | 7/2007 | Sakai et al. |
| 2007/0280592 | A1 | 12/2007 | Furuya et al. |
| 2011/0305456 | A1 | 12/2011 | Sharkawy et al. |
| 2017/0082908 | A1* | 3/2017 | Sharkawy .............. B82Y 20/00 |

* cited by examiner

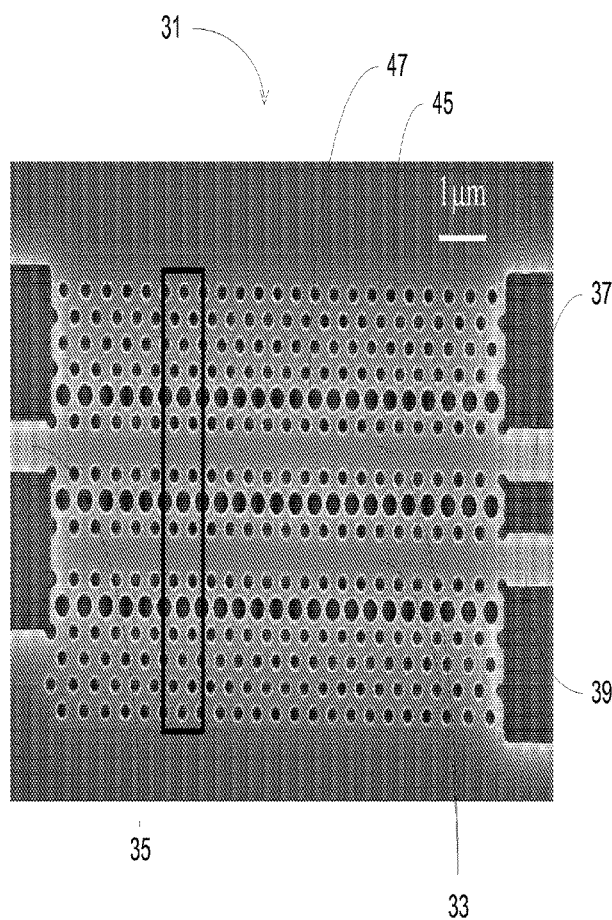
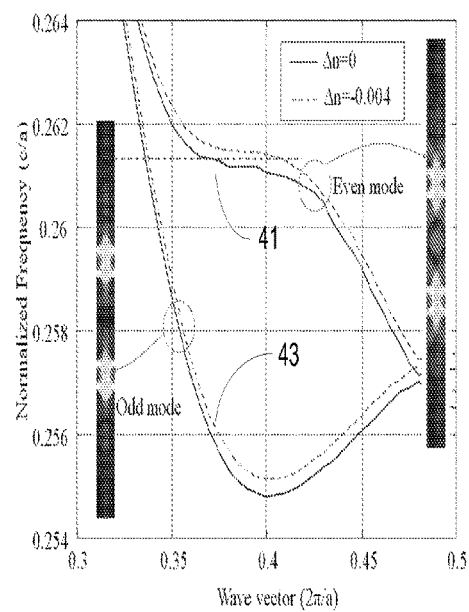
Fig. 2A
Fig. 2B

Configuration 1

OPTICAL ROUTER HAVING OPTICAL ROUTING NODES OF FOUR BI-DIRECTIONAL OPTICAL SWITCHES

PRIORITY

This application is a divisional of and claims priority to U.S. patent application Ser. No. 13/040,826 filed on Mar. 4, 2011, which is a continuation-in-part to U.S. patent application Ser. No. 12/910,198, filed Oct. 22, 2010, which claims priority to U.S. provisional application Ser. No. 61/272,706, filed Oct. 23, 2009. The disclosures of each of the aforementioned priority documents is incorporated herein by reference in its entirety.

BACKGROUND OF THE INVENTION

Field of the Invention

Embodiments of the present invention may relate to optical routing elements and optical routing arrays.

Background

The International Technology Roadmap for Semiconductors highlights key interconnects challenges for next-generation microprocessors and computing systems. The roadmap suggests that the most difficult challenges in the near term include the rapid introduction of interconnect processes compatible with device roadmaps, coupled with fine dimensional control and providing good mechanical stability and thermal budget. Further, the interconnect technologies should be able to meet performance requirements and manufacturing targets by leveraging low-cost conventional mass fabrication techniques and provide solutions to address global wiring scaling issues. The continued push towards finer geometries, higher frequencies and larger chip sizes increasingly exposes the disparity between interconnect needs and projected interconnect performance.

In order to realize reconfigurable computing, field programmable gate arrays (FPGAs) are vital, and hence there is a need to mimic neocortic interconnect architectures, namely 3D routing with exceedingly high bandwidth density. In that regard, realization of 2D and 3D interconnect routing topologies that use similar or compatible materials that achieve better scale of integration and alignment tolerance would be extremely beneficial.

Concepts for planar optical routing in a single layer of opto-electronic interconnects using a planar self-collimation photonic crystal have been proposed, as have a full three-dimensional interconnect using buried silicon micro-machining techniques. In the case of the slab, flip-chips are bonded onto an underlying CMOS substrate that contains the appropriate driver and receiver circuitry to input and output optical signals to the slab. The slab also contains optical sources and receivers that serve to generate and detect light. Within the slab, a self-collimation photonic crystal serves as the interconnect medium between the source and detector. In the case of the buried silicon optical interconnect technology, which may be referred to as the sub-surface silicon optical bus (S3B), direct integration into the CMOS process is easily achieved. The direction of propagation of the various optical signals as well as their destinations is achieved via electro-optical switches Electro-optical switches are key components of such photonic integrated circuits, yet only one proposal for implementing such switches—a resonator device—has appeared in the literature. The reconfigurable computing proposals may therefore benefit from additional options in electro-optical switches.

SUMMARY OF EMBODIMENTS OF THE INVENTION

Embodiments of the present invention may be directed toward an optical router, as a single optical routing element and/or as a plurality of interconnected optical routing elements (the latter is also referred to as a "routing fabric"). The optical routing element may be a photonic crystal slow light based switch which utilizes electrically or optically induced loss (conductivity). The photonic crystal may include two waveguides between which optical energy is coupled.

In a first separate aspect of an embodiment of the present invention, the photonic crystal may be a planar dielectric photonic crystal, which may include a lattice of holes having a first linear defect adjacent a second linear defect. The two linear defects may be separated by a central row of lattice holes. The first linear defect may form a first single mode line defect waveguide, and the second linear defect may form a second single mode line defect waveguide. Optical energy may be selectively coupled between the first and second waveguides across the central row of lattice holes. Optionally, the lattice of holes may spatially taper adjacent the output coupling interfaces of each respective waveguide.

In a second separate aspect of an embodiment of the present invention, the optical routing element may include a free-carrier injector configured to inject free-carriers into the photonic crystal. Activation of the free-carrier injector may alter optical coupling selectivity between the first and second waveguides. In one implementation, the free-carrier injector, when activated, may be configured to alter the refractive index of the photonic crystal by at least 0.004.

In a third separate aspect of an embodiment of the present invention, a plurality of the optical routing elements may each include a photonic crystal operatively coupled to a free-carrier injector. The photonic crystals may be interconnected to form a bidirectional routing array having a plurality of input/output ports, such that selective activation of the photonic crystals with the respective free-carrier injectors may enable routing of an optical signal from any one of the plurality of ports to any other of the plurality of ports.

In a fourth separate aspect of an embodiment of the present invention, the photonic crystal may be configured to couple optical energy at a first wavelength between the waveguides while not coupling optical energy at a second wavelength between the waveguides. The first and second wavelengths may differ by about 0.4 nm to 0.8 nm.

In a fifth separate aspect of an embodiment of the present invention, the photonic crystal may be configured to couple optical energy between the waveguides while exhibiting an extinction ratio of about −17 dB.

In a sixth separate aspect of an embodiment of the present invention, any of the foregoing aspects may be employed in combination.

Accordingly, an improved optical router may be obtained. Advantages of the improvements will appear from the drawings and the description of the preferred embodiment.

BRIEF DESCRIPTION OF THE DRAWINGS

In the drawings, wherein like reference numerals refer to similar components:

FIGS. 2A & 2B show an image of a directional photonic crystal routing element and a dispersion diagram associated therewith;

DETAILED DESCRIPTION OF VARIOUS EMBODIMENTS

The routing elements described herein may use photonic crystals (PhCs) along with the slow light effect in order to reduce and/or minimize the coupling length needed to switch the optical beam between two waveguides. By forming a defect in the PhC with a photonic band gap, photons can propagate only along the line defect, thus forming a waveguide. In the case of the coupler, two single mode waveguides may be brought into close proximity to each other, forming a two mode system. These two modes, called even and odd modes, may propagate with different group velocities, causing energy to flow from one waveguide into the other. The distance needed to achieve this coupling may generally be related to the inverse of the separation between the wave numbers of the two modes. Therefore, maximizing the separation of the two modes in k-space may serve to minimize the coupling distance. This may be achieved using the slow light effect, which causes a sharp change in the mode separation in k-space. Using this technique, coupling distances as short as 5 µm may be obtained. The passive coupler, when combined with an active method for changing the refractive index, can be used as a highly sensitive switch.

Figure 1:
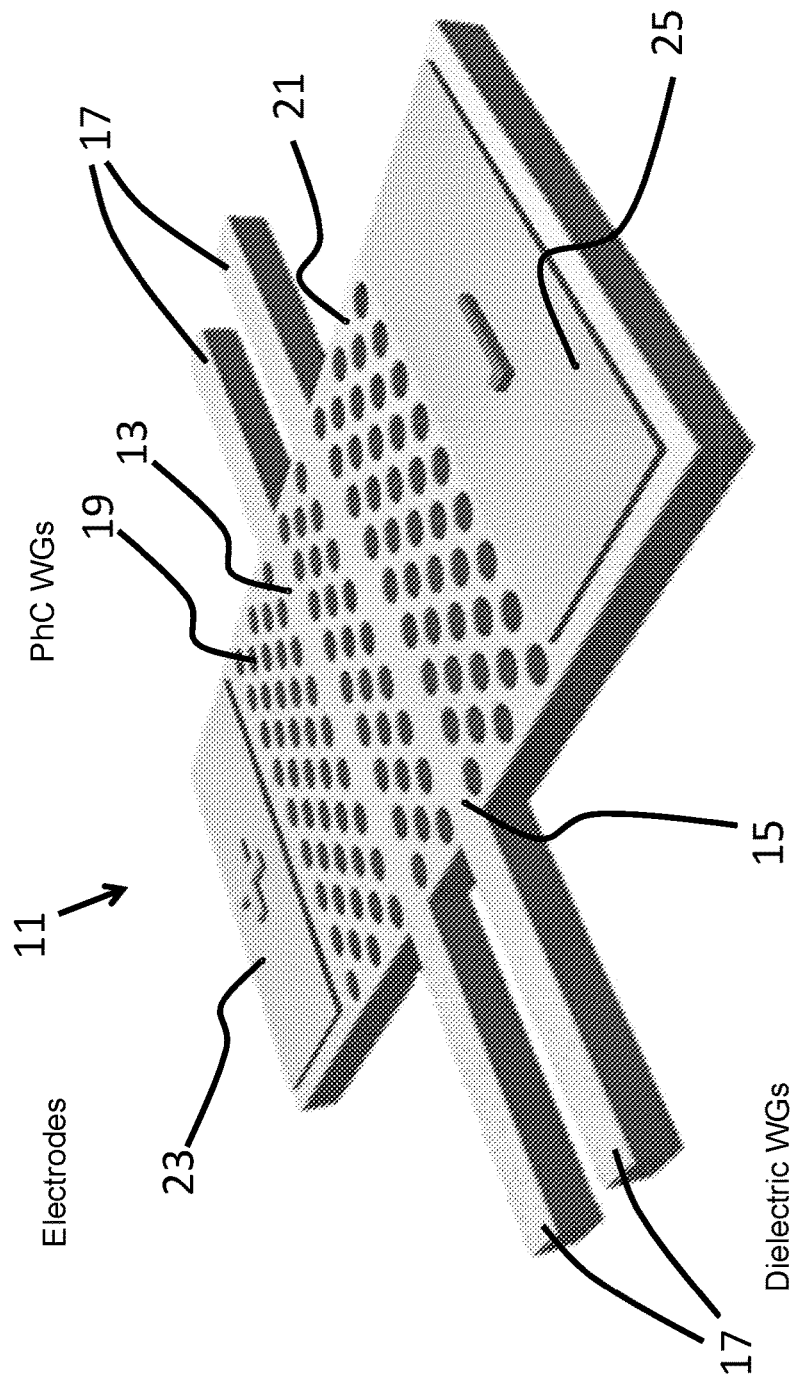
FIG. 1 illustrates a bi-directional photonic crystal routing element.

Turning in detail to the drawings, FIG. 1 illustrates a bi-directional photonic crystal routing element 11. The routing element 11 is illustrated as including two waveguides 13, 15 and four input/output ports 17 coupled to the waveguides 13, 15. The waveguides 13, 15 may each be formed by linear defects in a lattice of holes 19 formed on a planar photonic crystal 21. The P and N electrodes 23, 25 of a PIN diode may be disposed on opposite sides of the lattice 19. The PIN diode may serve to change the refractive index of the PhC, thereby enabling use of the routing element 11 as an active optical switch.

The remainder of the disclosure below explores the properties of this bidirectional photonic routing element (four input/output ports), along with those of the simpler directional photonic routing element (one input port and two output ports), and applications for each as interconnected elements in routing fabric. Property and design highlights for these elements and routers may include:

- employing slow-light properties of planar photonic crystal structures;
- the slow-light properties (slow light factor=60) may enable compact device design;
- individual routing elements may be constructed with dimensions of 10 µm×5 µm (~20 photonic crystal lattice elements);
- a routing node may have overall dimensions of 50 µm×50 µm;
- full bi-directional routing may be enabled;
- individual routing elements may be optimized to attain routing for low-refractive index changes (Δn=0.004);
- the power needed for routing may be optimized to less than 1 mW per routing element;
- the propagation loss may be about 0.0035 dB/µm, or $4\times10^{-2}$ dB per routing element;
- coupling between waveguides in a routing element may exhibit an extinction ratio of about −17 dB;
- the ability to filter and route C-band channels with channel spacing of 4 nm and routing of C-band channels with channel spacing of 0.4 nm;
- pulse dispersion of 1.5 ps $nm^{-1}$ $mm^{-1}$ may be achieved;
- eight channel routing of interconnected routing elements, using various topologies, may be demonstrated;
- active tuning elements may be obtained, along with optimized device performance, for low routing power (1 mW) using optimal doping concentrations (~$5\times10^{18}$ $cm^{-3}$);
- the switching time for a routing element with active tuning elements was experimentally demonstrated at 500 ns; and
- a dispersion-free regime of up to 160 Gb/s may be obtained.

Design of a Slow-Light Based Nanophotonic Routing Element

As a solution to the growing demand for optical intra-chip communication and routing, a dielectric 2D photonic crystal (PhC) directional coupler, which may be actively switched in plane, may be provided. This PhC device may be used to selectively couple light between two waveguides as a routing element, and it may be constructed having a device footprint less than 10 µm×10 µm. The PhC device that meets these design specifications, as described below, may be referred to as a Coupled Photonic Crystal Waveguide (CPhCWG). When compared to traditional dielectric PhC couplers, the design of the CPhCWG may allow a larger coupling bandwidth with lower power consumption for active switching due to the ability to have small device dimensions.

An image of a directional CPhCWG 31 is shown in FIG. 2A. This directional CPhCWG 31 image is of a fabricated directional CPhCWG in a 260 nm Silicon-on-insulator (SOI) substrate. Similar devices could be fabricated in a SOI thicknesses ranging from about 210 nm to 270 nm. The directional CPhCWG 31 may include two coupled line defect photonic crystal waveguides 33 forming a single input port 35 and two output ports, referred to herein as the bar port 37 and the cross port 39. Each line defect waveguide may be formed by "removing" a row of holes in the PhC (i.e., not forming the row of holes during the manufacturing process, which is well-known to those of skill in the relevant arts), thereby restricting the propagation of light to only be in the direction of the removed row. The two proximal waveguides may then form a system of modes with overlapping profiles, as shown in the dispersion diagram of FIG. 2B. Here, the two modes are referred to as being even 41 and odd 43. The two modes may generally propagate in the waveguides with different group velocities, resulting in exchange of optical power between the two waveguides.

The directional CPhCWG 31 may include holes of two different sizes. The smaller holes 45 may form the bulk of the lattice, and the larger holes, referred to herein as central holes 47, may help control the characteristics of the modes that propagate in the waveguides. As is discussed in greater detail below, changing the diameter of the central holes 47 may aid in fine-tuning characteristics such as coupling efficiency and coupling length. At times, it may be convenient to measure the coupling length in terms of transverse lattice elements; one transverse lattice element 49 is shown outlined in FIG. 2A. With appropriate choices in hole diameters, certain spectra of optical energy may be coupled between the waveguides in as few as five transverse lattice elements.

The CPhCWG may utilize the slow light effect to reduce the physical device length while maintaining a longer effective interaction length between the waveguides. This effect may be realized by engineering the dilation of hole diameters in the PhC to flatten the band of the even mode. As a result of the light traveling slower in the PhC, the light may be subject to more of the material and device features, allowing for the coupling length to be less than 10 µm. The increased interaction may also allow for a subtle index change of Δn=−0.004 to switch the CPhCWG's output from one port to the next. The device characteristics may differ from traditional PhC couplers by offering a wider coupling bandwidth and reduced power requirements, but drawbacks may arise in the fabrication of the device. Because the optical properties of the device may be affected by the device design, perhaps more than with other devices, the tolerance of fabrication dimensions and effect of defects may be greatly amplified. For example, a dilation of 2 nm in a hole diameter of 330 nm may result in a ~5 nm shift of the coupling wavelengths. The enhanced material interaction and low index change requirements may allow the CPhCWG to selectively couple between the two ports through free-carrier injection of an in-plane PIN diode. By using a PIN diode, free-carriers may be injected laterally across the PhC lattice, which may change the refractive index of the silicon and may directly shift the spectrum that is coupled between the waveguides. The routing element may naturally rest in the "OFF" state with no applied bias, coupling optical energy directed into the input port 35 to the cross port 39, and turning the routing element "ON" under forward bias, the optical spectrum may blue-shift, resulting in the optical energy being coupled to the bar port 37.

Figures 3A, 3B, 3C:
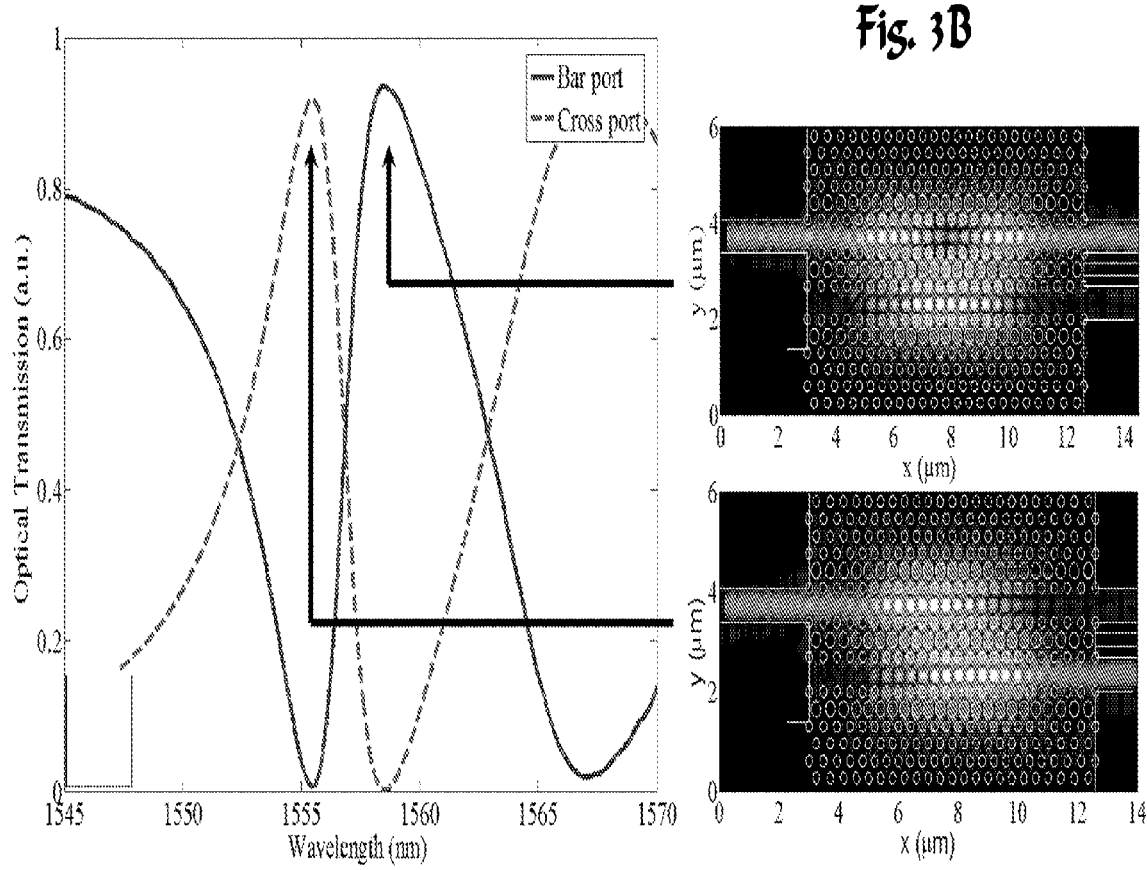
FIGS. 3A-3C show the simulated output from a directional photonic crystal routing element.

Such behavior can be observed through the finite-difference time-domain (FDTD) simulation results shown in FIGS. 3A-3C. FIG. 3A shows the simulated output of the directional CPhCWG for the bar and cross ports. FIG. 3B illustrates a simulated directional CPhCWG coupling input optical energy to the bar port, and FIG. 3C illustrates a simulated directional CPhCWG coupling input optical energy to the cross port. As depicted, FIG. 3B may represent the "ON" state for a directional CPhCWG, and FIG. 3C may represent the "OFF" state.

Design of Routing Element Using PhC Directional Coupler

The dispersion properties of the coupled waveguide modes can be extracted using the Plane Wave Expansion Method (PWEM) where the electromagnetic wave equation is solved as an eigenvalue problem with a periodic boundary condition and using a coupled waveguide structure as a unit cell for the analysis.

Figure 4:
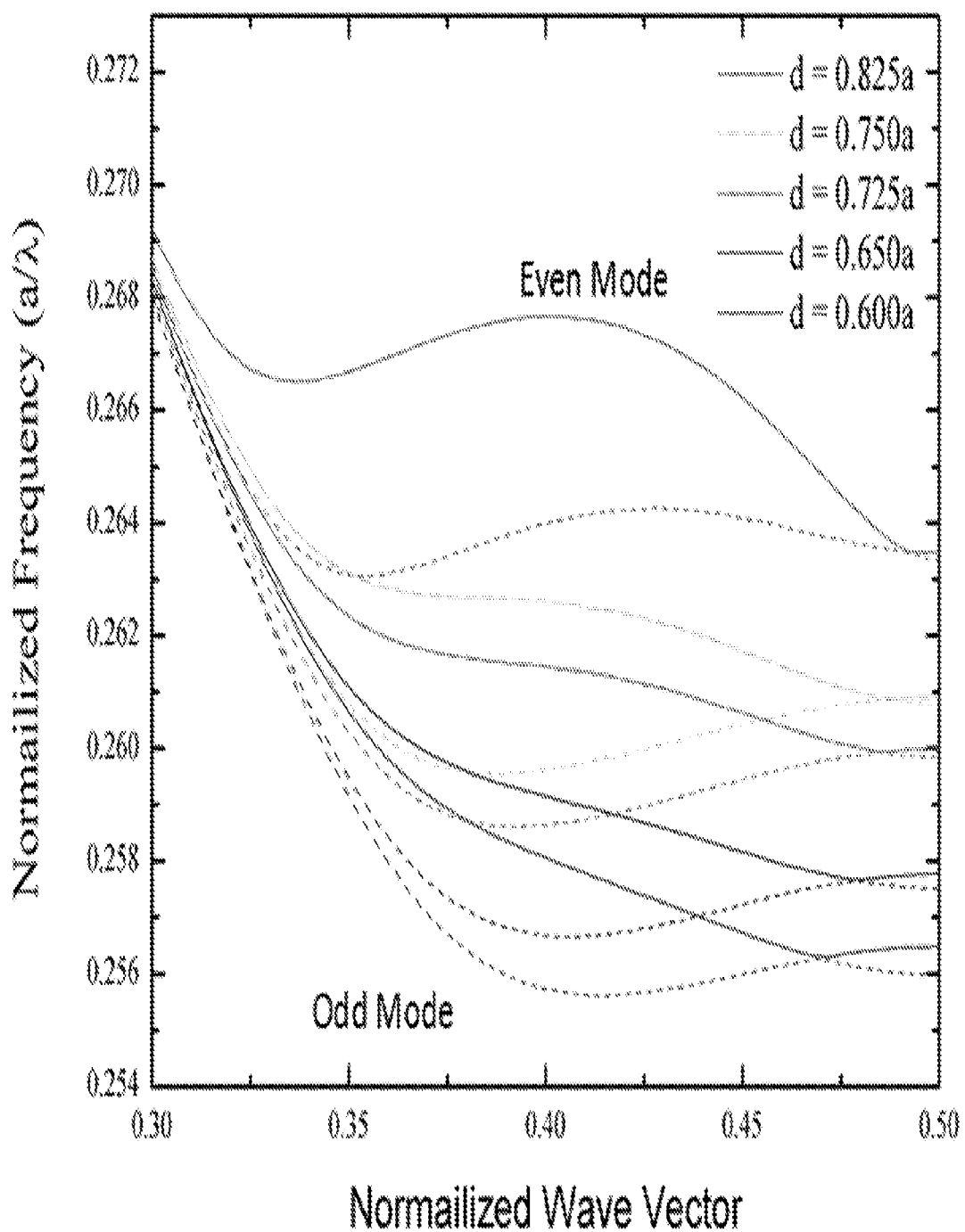
FIG. 4 illustrates band diagrams corresponding to changes in the size of holes between two waveguides.

FIG. 4 is a dispersion diagram for various mode profiles, each based on a different hole diameter in the PhC. From the dispersion diagram, it is evident that at certain frequencies, i.e., between 0.256 $a/\lambda$ and 0.268 $a/\lambda$, the wavevectors between even and odd modes are quite different. At the maximum point, the difference may be larger than 0.01. From the coupling length formulation (Eq. (3) below), a coupling length of around 5 lattices may be obtained. Such a short coupling length can be used for ultra compact optical routing applications.

The dispersion properties of the coupled waveguide structure can be tuned by changing the air hole sizes in the central row as well as the cladding surrounding both waveguides.

The dispersion diagrams with different air hole sizes are illustrated in FIG. 4. As the central hole diameter, d, increases from 0.6 a to 0.825 a, both even and odd modes shift to higher frequencies. As d increases to 0.825 a, there are two important features for the even mode as observed from the dispersion diagrams. First, the slopes of two modes are almost parallel within the frequency range from 0.255 to 0.267 $a/\lambda$. The large frequency range indicates large operational bandwidth. On the other hand, at frequency of 0.267 $a/\lambda$, the dispersion curvature becomes flat at k=0.4. As is known from the definition of group velocity, the group index will be very large in this case, and a significant slow light propagation in the photonic crystal waveguide can occur. As a result, the strong EM coupling between even and odd modes may lead to an efficient energy transition between waveguides, which may be used to reduce the coupling length. To this end, by means of the fine-tuning of air hole sizes, a large group index, which typically ranges from 40 to 400, may be achieved.

Fabrication and Characterization of Single Routing Elements

A prototype of a routing element, as shown in FIG. 2, may be fabricated using e-beam lithography and an Inductively Couple Plasma Reactive Ion Etch (ICP-RIE) with fluorine based chemistry for pattern transfer into the SOI wafer. Experimental characterization of a sample fabricated in this way was performed by fiber coupling an optical signal, supplied by a tunable laser source, into the photonic device. The routing element structure shown in FIG. 5 was simulated numerically with a coupling region of 12.8 μm, and the routing element was experimentally fabricated and spectrally characterized with the tunable lasers.

Figure 5:
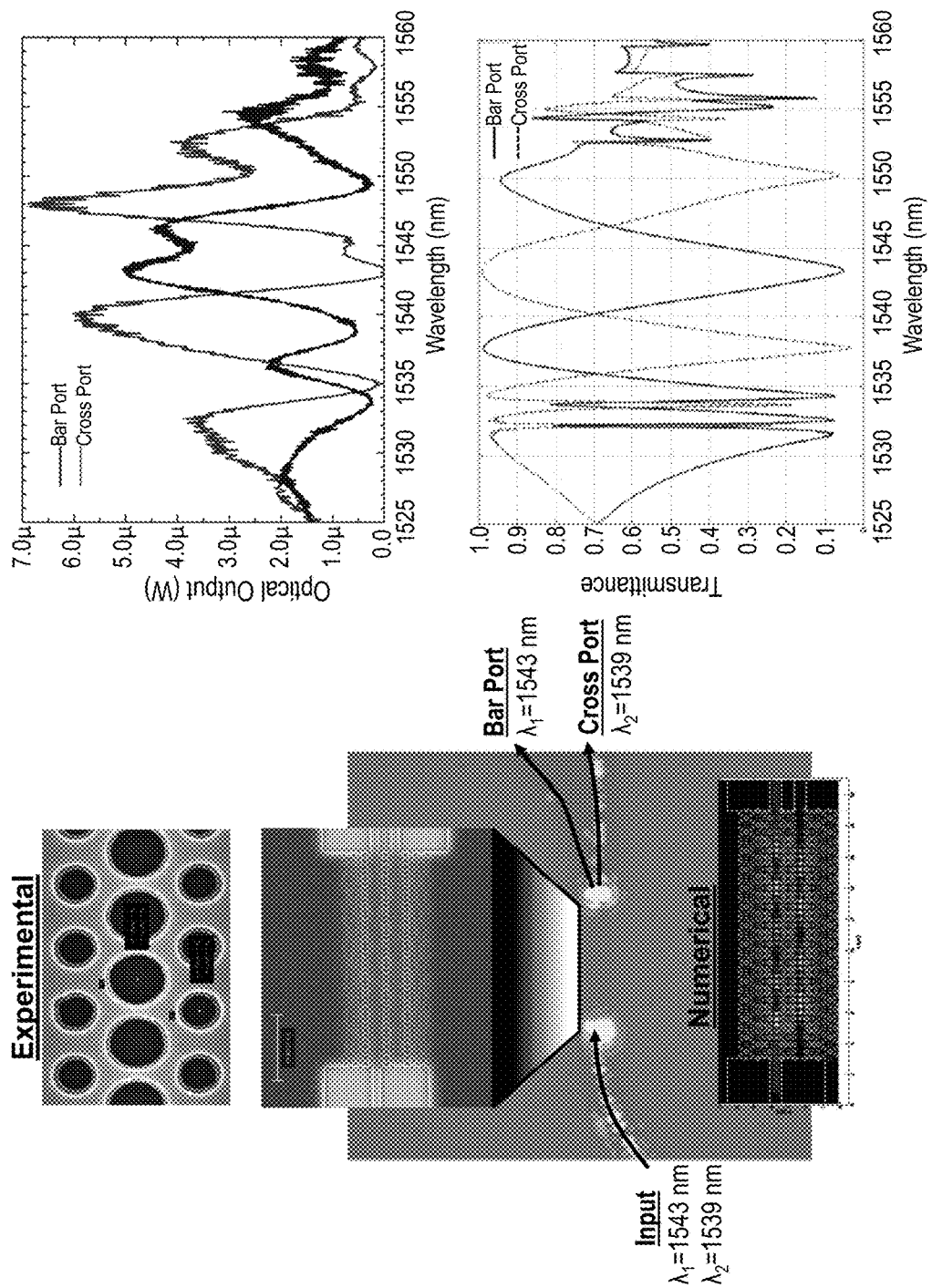
FIG. 5 illustrates a comparison between calculated and experimental results from a directional photonic crystal routing element.

In FIG. 5, the lighter regions within the image of the two wavelengths propagating through the device is scattered light from the waveguides being supported by the underlying oxide. It should be noticed that there is not a traceable amount of light detected that is scattering from the photonic crystal routing element. The characterization of the single photonic crystal routing element presented the routing of two wavelengths with a separation of 1.16 nm across two ports with an average extinction ratio of −17 dB, agreeing with a numerical analysis of the routing element.

Figure 6:
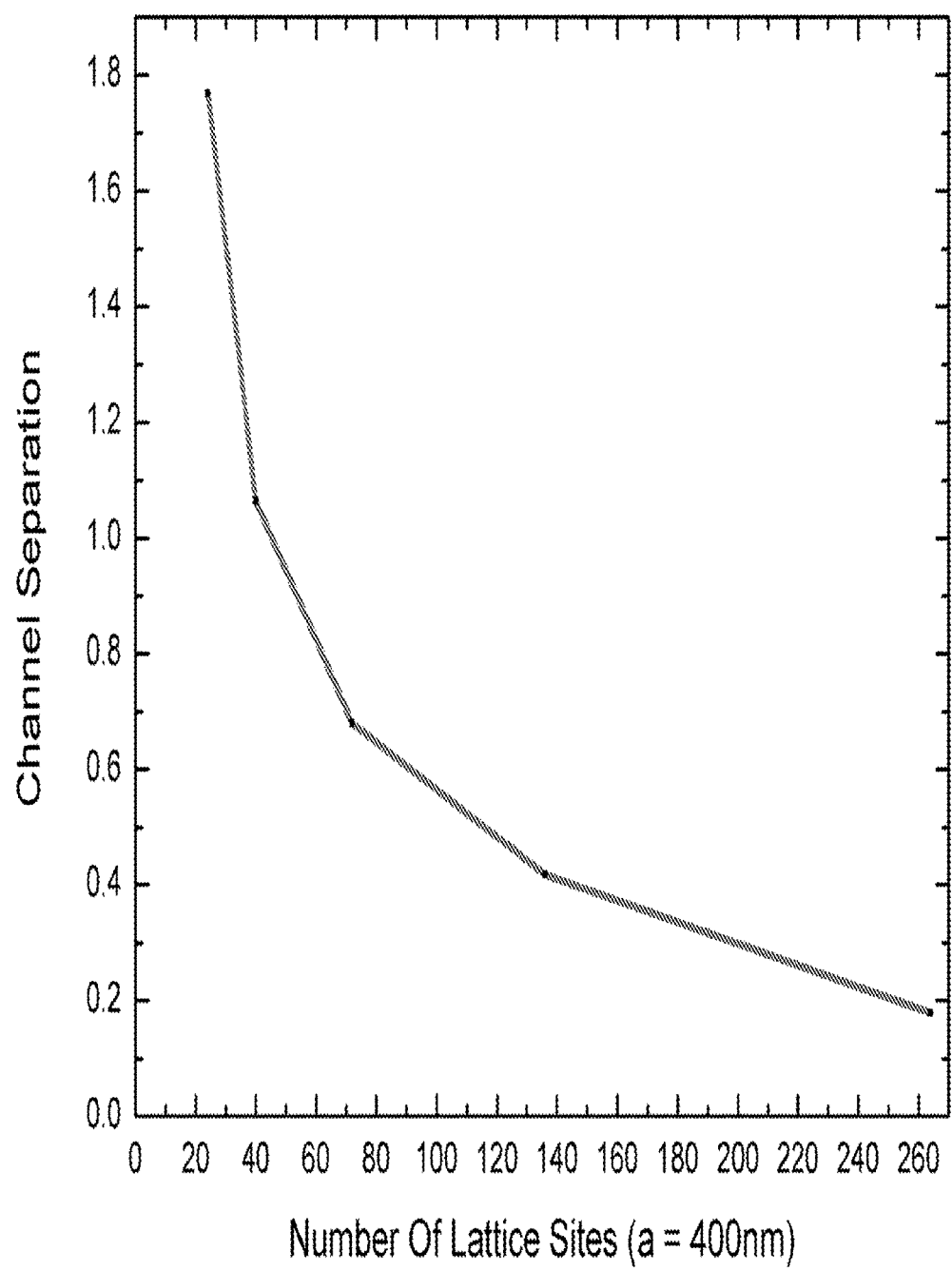
FIG. 6 illustrates the relationship between the number of lattice sites and channel separation.

Spectral responses of fabricated single routing elements with varying coupling lengths were performed, demonstrating the tunable nature of the channel spacing through the adjustment of the coupling length via inserting or removing the number of lattice sites that the photonic crystal couples over. The separation of 6 nm between routable wavelengths, where the input wavelength is tuned from 1550 nm to 1557 nm, illustrates the ability to passively route channels within the International Telecommunication Union (ITU) standards for optical routing. FIG. 6 illustrates the relationship between the number of lattice sites and channel separation.

Tuning Routing Elements

By taking advantage of the slow light effect in the coupled PhC waveguide, an active switching routing element can be designed using a nonlinear medium. As an example, thermal-optic and electro-optic free-carrier injection approaches may be applied to change the refractive index of the host material, thereby tuning the dispersion properties. In such way, this compact coupler can be used to achieve highly sensitive and tunable optical devices, such as tunable optical splitter. One approach that can be used is to change the refractive index through free-carrier injection, where two electrodes are lithographically defined to apply a current through the PIN junction, with the PhC disposed within the junction. Through free-carrier injection, the maximum change of index can be on the order of 0.01, which may provide enough dynamic range for the designed active routing element.

Figure 7:
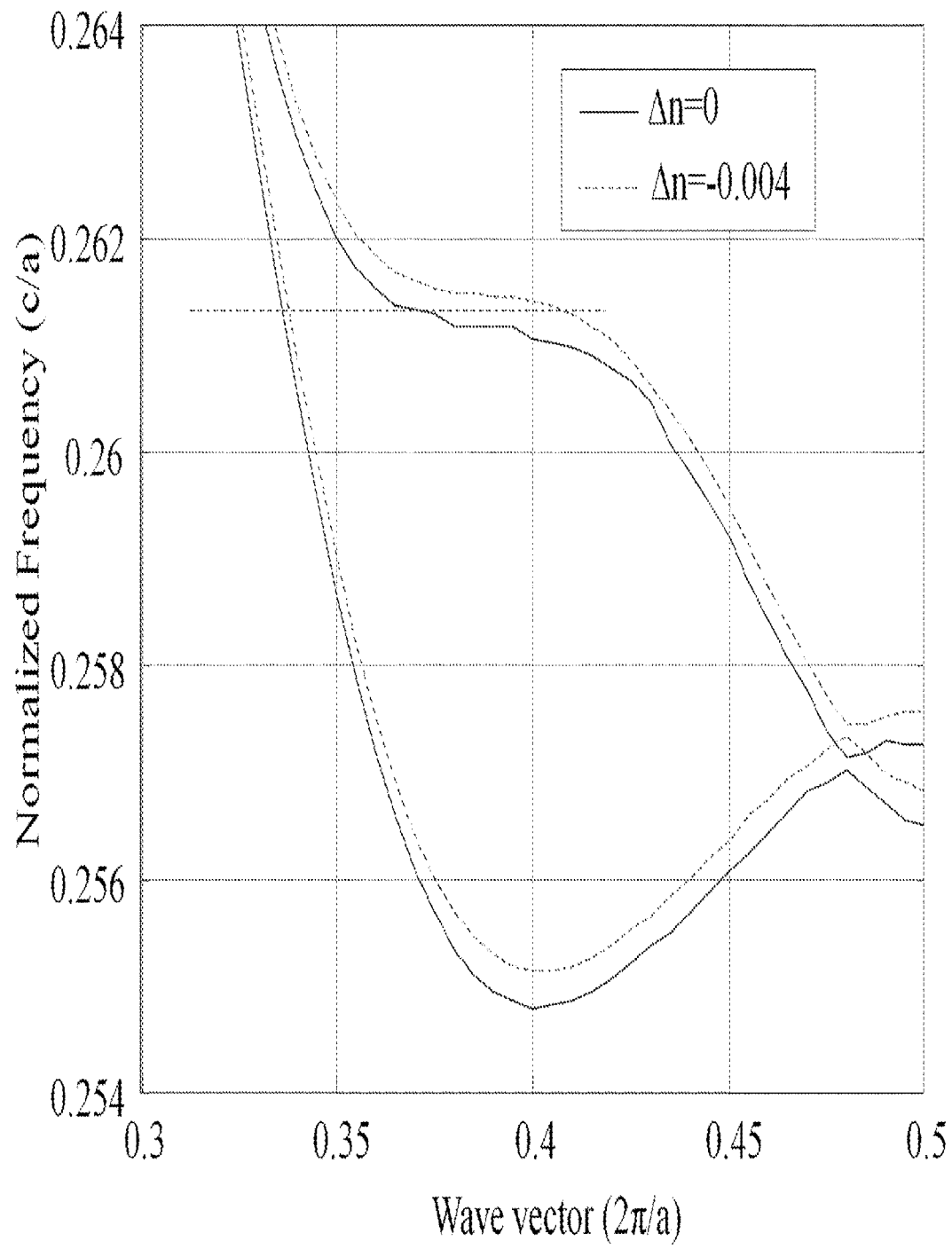
FIG. 7 illustrates a band diagram showing the effect of changes in the refractive index in a directional photonic crystal routing element.

To investigate the sensitivity of the optical routing element, the refractive index of the silicon host material was tuned down by $\Delta n = -0.004$ from the original index of 2.9. FIG. 7 illustrates the dispersion diagrams with refractive indices of 2.9 and 2.896. At a frequency of 0.2615 c/a, the wave vector difference of even and odd modes at $\Delta n = -0.004$ are doubled compared with the case of $\Delta n = 0$, which means that the coupling length is reduced by a factor of two. This may allow complete light switching to be achieved between the two waveguides with an index change of as little as 0.004. Depending upon the materials used, switching with yet smaller index changes may be achieved.

To confirm the design, a bi-directional routing element was simulated by using the FDTD method. The design wavelength was chosen around 1500 nm. The background and central row air hole sizes were chosen as 240 nm and 340 nm, respectively. Different hole sizes may be selected depending upon the wavelength for which the routing element is designed. A total length of 14 lattice elements was used for the coupling. The routing element was fed with four dielectric waveguides. The dielectric waveguide had a width of 690 nm. Due to the strong mismatch between the group velocity of the dielectric waveguide and that of the coupled PhC waveguide, a spatial lattice tapering near the interface along the propagation direction was introduced to minimize the unwanted interface reflection. At both interfaces three PhC lattices were linearly tapered from 480 nm to 400 nm. Based on this design, an improved transmission was achieved in the simulations.

Figure 8A:
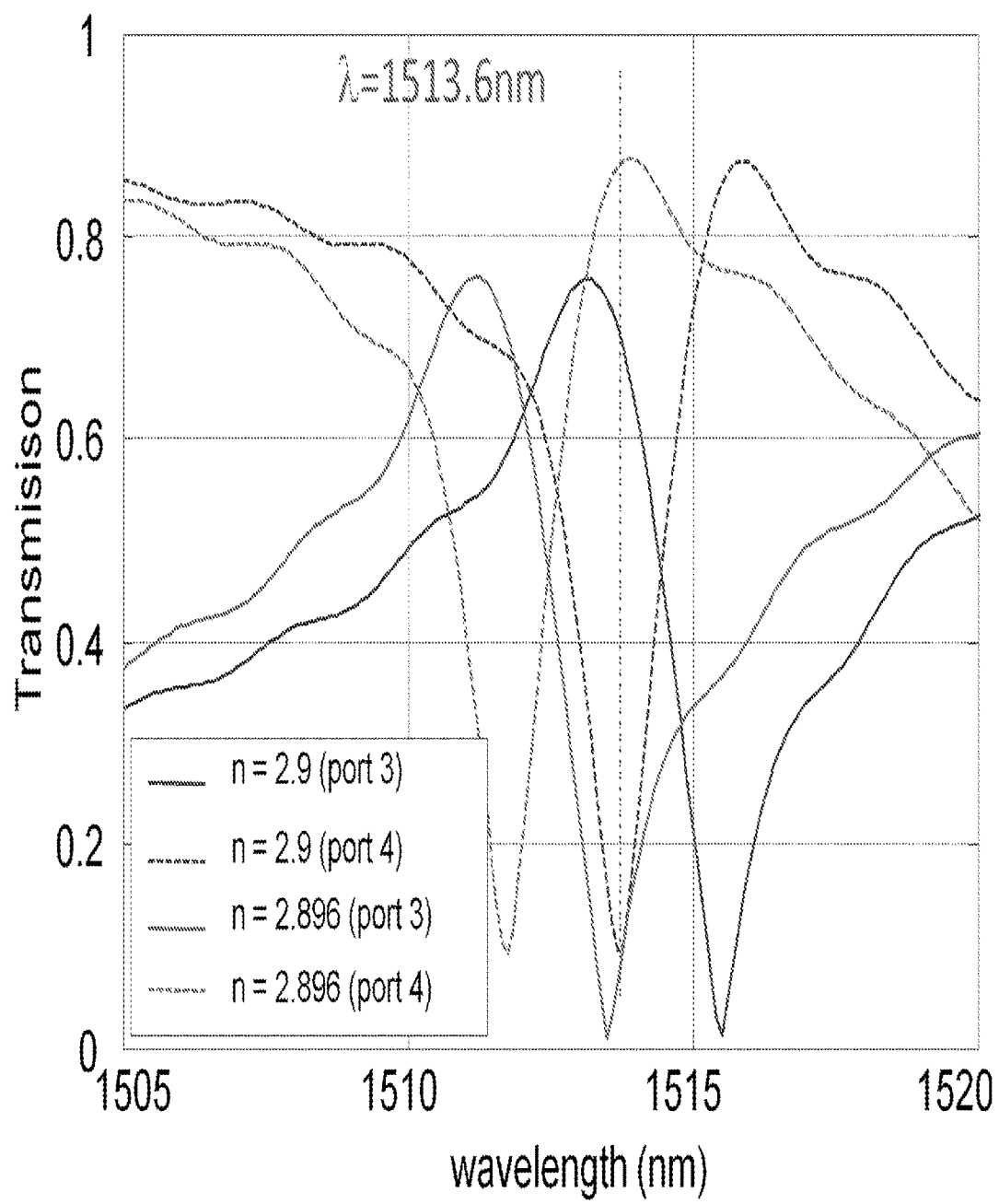
FIGS. 8A-8C show the simulated output from a switched directional photonic crystal routing element.
Figure 8B:
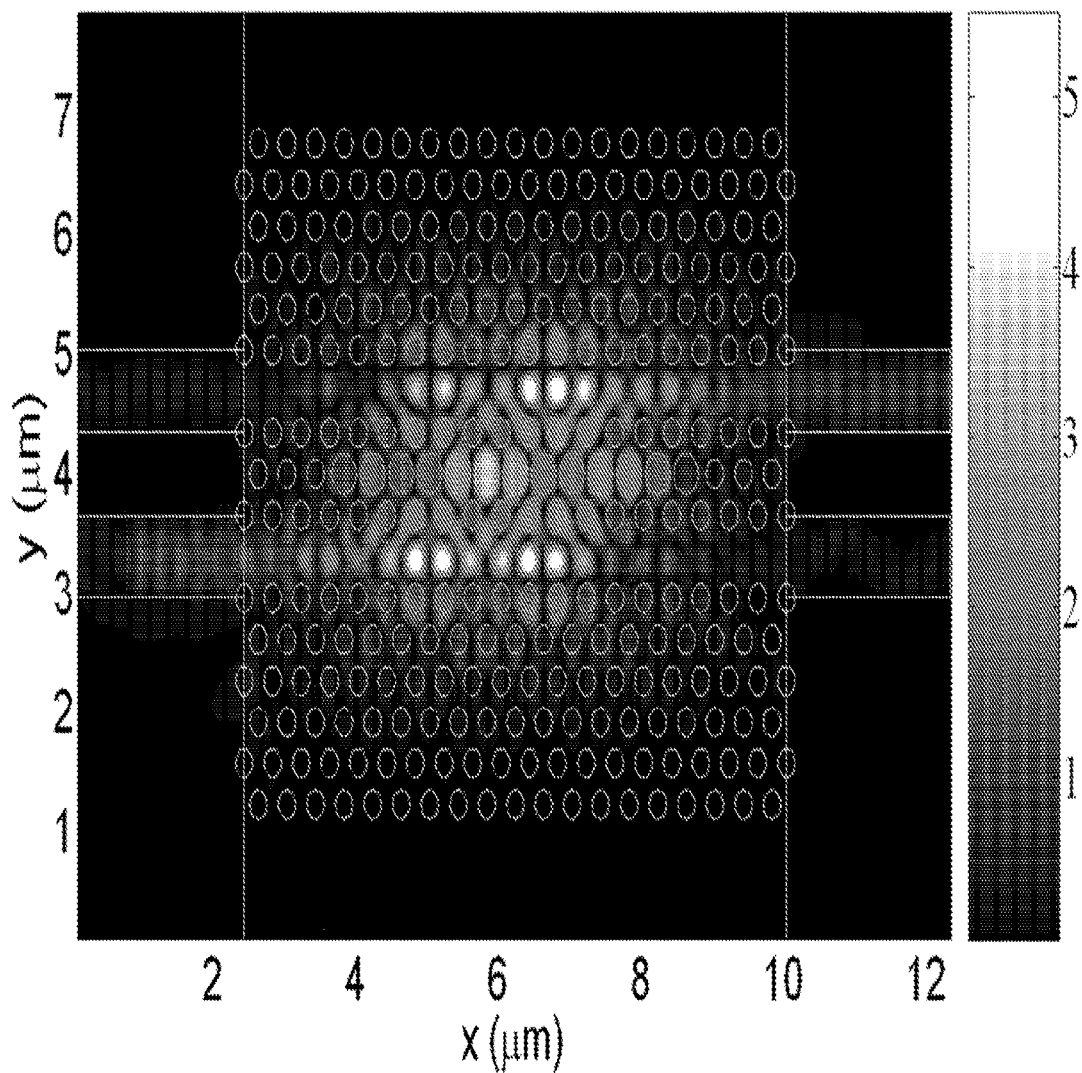
Figure 8C:
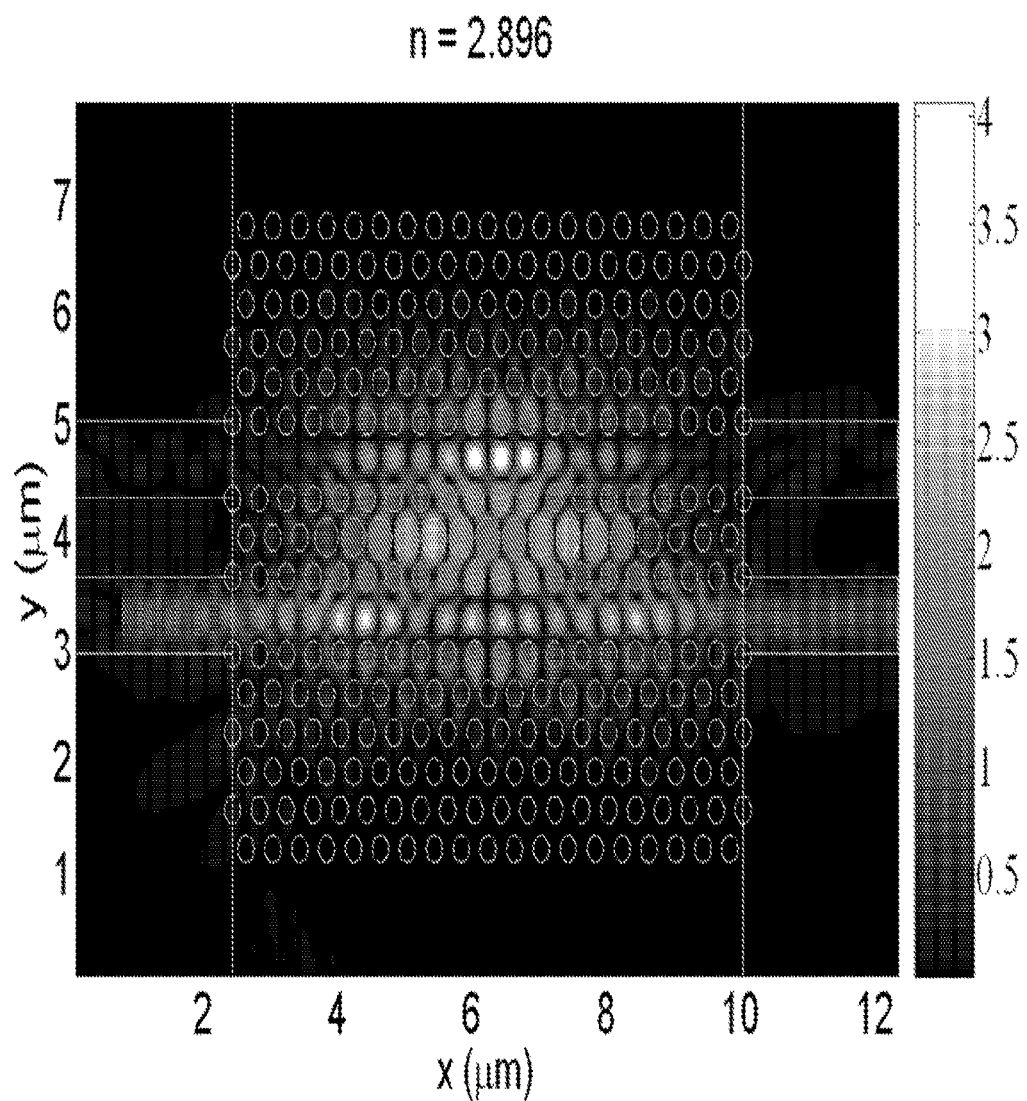

To characterize the spectrum response, a few detectors were placed at the two output ports, labeled port 3 and port 4 in FIGS. 8B & 8C, to record both transient and frequency spectra. FIG. 8A illustrates these spectra, which show that at a wavelength of 1513.6 nm, ports 3 and 4 achieve complete switching by an index change of 0.0004. FIGS. 8B & 8C illustrates this complete switching by simulation of the power flow through in a routing element having a refractive index of 2.9 in FIG. 8B and a refractive index of 2.896 in FIG. 8C. The steady state results of the electrical fields in the computational region demonstrate the high throughput coupling of the routing element.

Figure 9:
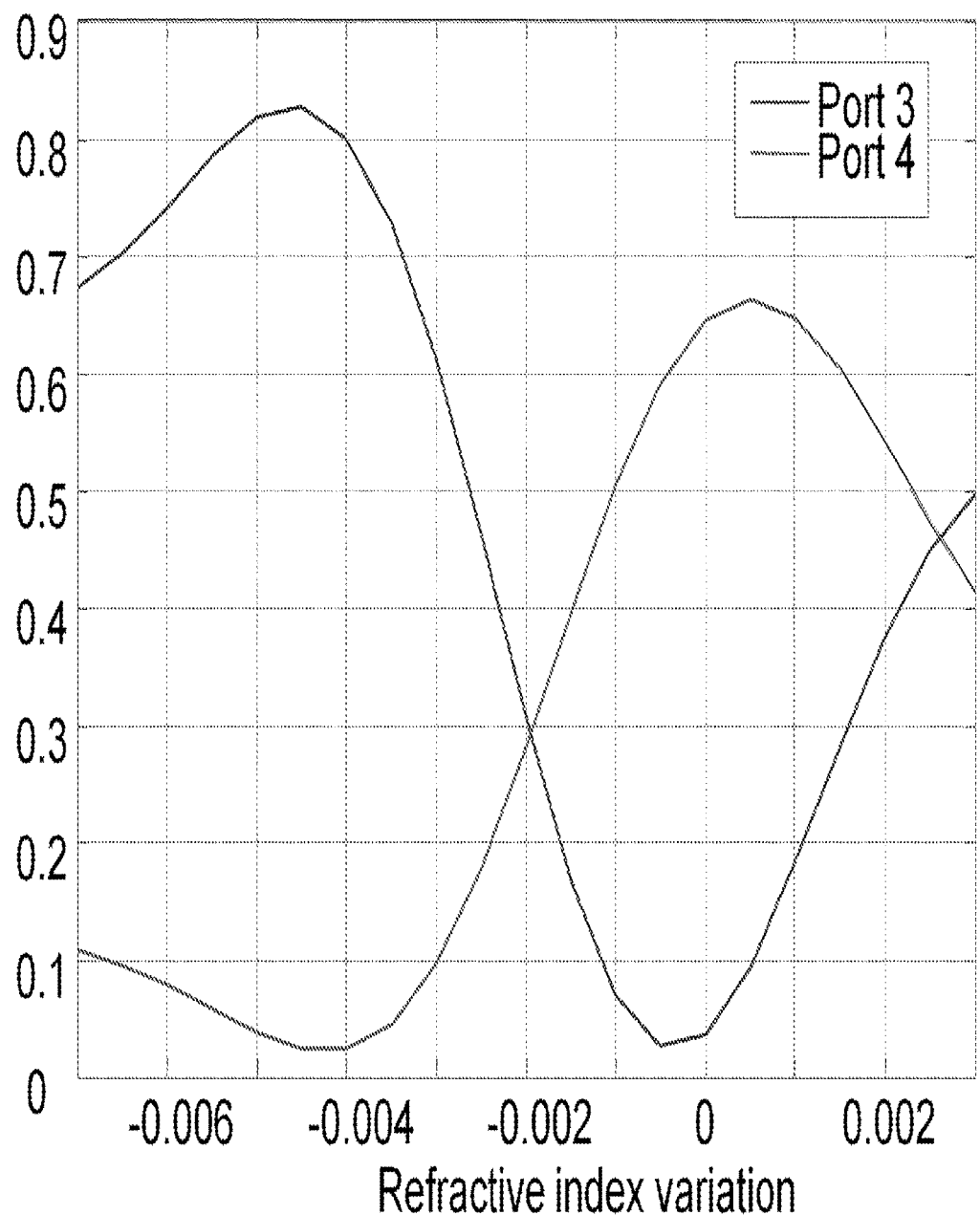
FIG. 9 illustrates changes in spectral output as compared to changes in the index of refraction.

In addition, the host material index may be continuously varied to study the modulation at the wavelength of 1513.6 nm. The transmission response of ports 3 and 4 versus the varying refractive index are illustrated in FIG. 9.

Actively Tuning Routing Elements

As has been indicated above, a routing element may be actively switched. For example, by applying an electric field, a change in the propagation constant and hence the index of refraction in the coupling region between the two waveguides, may be induced, and the system may change from a symmetric system of coupled PhC waveguides into a non-symmetric one. In this case the equation for the coupling length between the two waveguides may be modified to include the change in the refractive index caused by the external applied field as follows:

$$L_E = \frac{\pi}{2\sqrt{(\kappa^2 + \Delta^2 n)}} \tag{1}$$

where $L_E$ is the length for full power transfer under external excitation.

Mathematically, the operation of the routing element can be formulated as being in either one of two states: the "bar" state (ON), when the energy launched at the near end of one of the waveguides exits from the far end of that same waveguide; and the "cross" state (OFF), when the energy launched at the near end of one of the waveguides exits at the far end of the other waveguide.

Using coupled mode theory, Equation (4) may be simplified to the following $$(\kappa L)^2 + (\Delta\beta L)^2 = (v\pi)^2. \tag{2}$$

where v is a positive integer, and where:

$$\kappa L = (2v-1)\frac{\pi}{2}, \tag{3}$$

where v is again any positive integer. From Equation (3), the shortest length for complete coupling is determined to occur when $L = \pi/(2\kappa)$.

Figure 10:
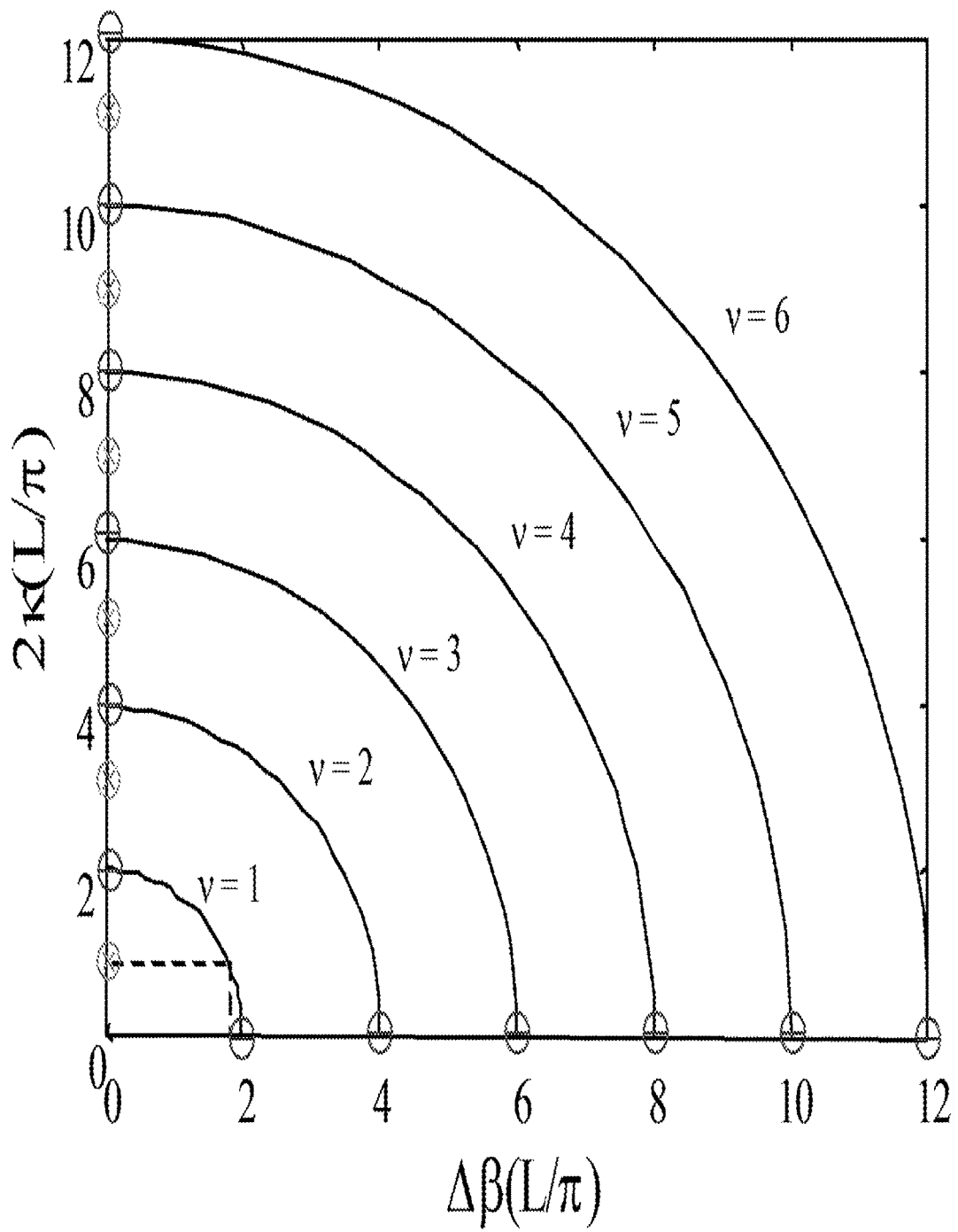
FIG. 10 illustrates the relationship between cross and bar states for a photonic crystal routing element and moving between those two states based on changes in the phase mismatch.

A plot of Equation (3) is shown in FIG. 10, which shows that the cross states lie at isolated points on the axis $\Delta\beta = 0$ corresponding to the synchronous case, whereas the bar states are represented by the arcs. Starting from a cross state, a bar state can be reached only by changing the phase mismatch $\Delta\beta$ shown by the dotted line. Or mathematically, starting from a cross state with κL=π/2, then the required phase mismatch can be found from Equation (2) as $$\Delta\beta = \kappa\Delta n = \sqrt{3}\frac{\pi}{L}. \quad (4)$$

The phase mismatch condition can be achieved by applying an external excitation which my thus result in switching between the cross and the bar states.

The "loss tangent" of the dielectric material in the coupling region can be modified by external "commands" to spoil the coupling, thereby re-routing the light. This may be characterized as an Δα switch (not the classical Δβ switch), in which the change in optical absorption coefficient Δα is employed (the change in conductance Δσ is proportional to Δα) as a modulating mechanism. The induced loss may not significantly attenuate the waves traveling in the straight-through channels. This behavior may be analogous to circumstances where electro-absorption has been assumed to reduce the Q of micro-ring resonators coupled to strip channel waveguides. To attain switching in the waveguides made from Si/air or Si/SiO$_2$, the free-carrier absorption loss of Si can be controlled by (1) free-carrier injection from forward-biased PN junctions on the rods, (2) depletion of doped rods with MOS gates, or (3) generation of electrons and holes by above-gap light shining upon the coupling area, a contact less process. If the routing element is implemented in III-V semiconductor hetero-layers, then the electro-absorption effect may be used. As is illustrated in FIG. 11, a PIN diode is positioned with the routing element in the intrinsic region to introduce free-carriers into the PhC.

Figure 11:
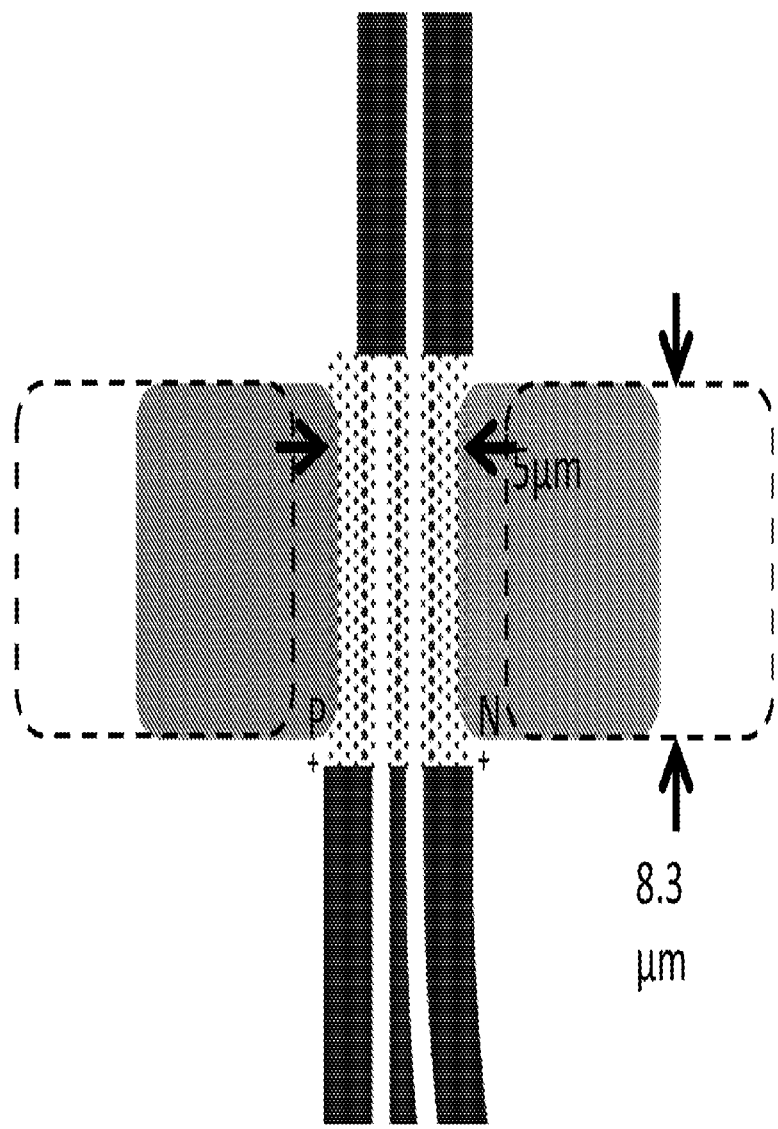
FIG. 11 illustrates a directional photonic crystal routing element with a PIN diode.
Figure 12A:
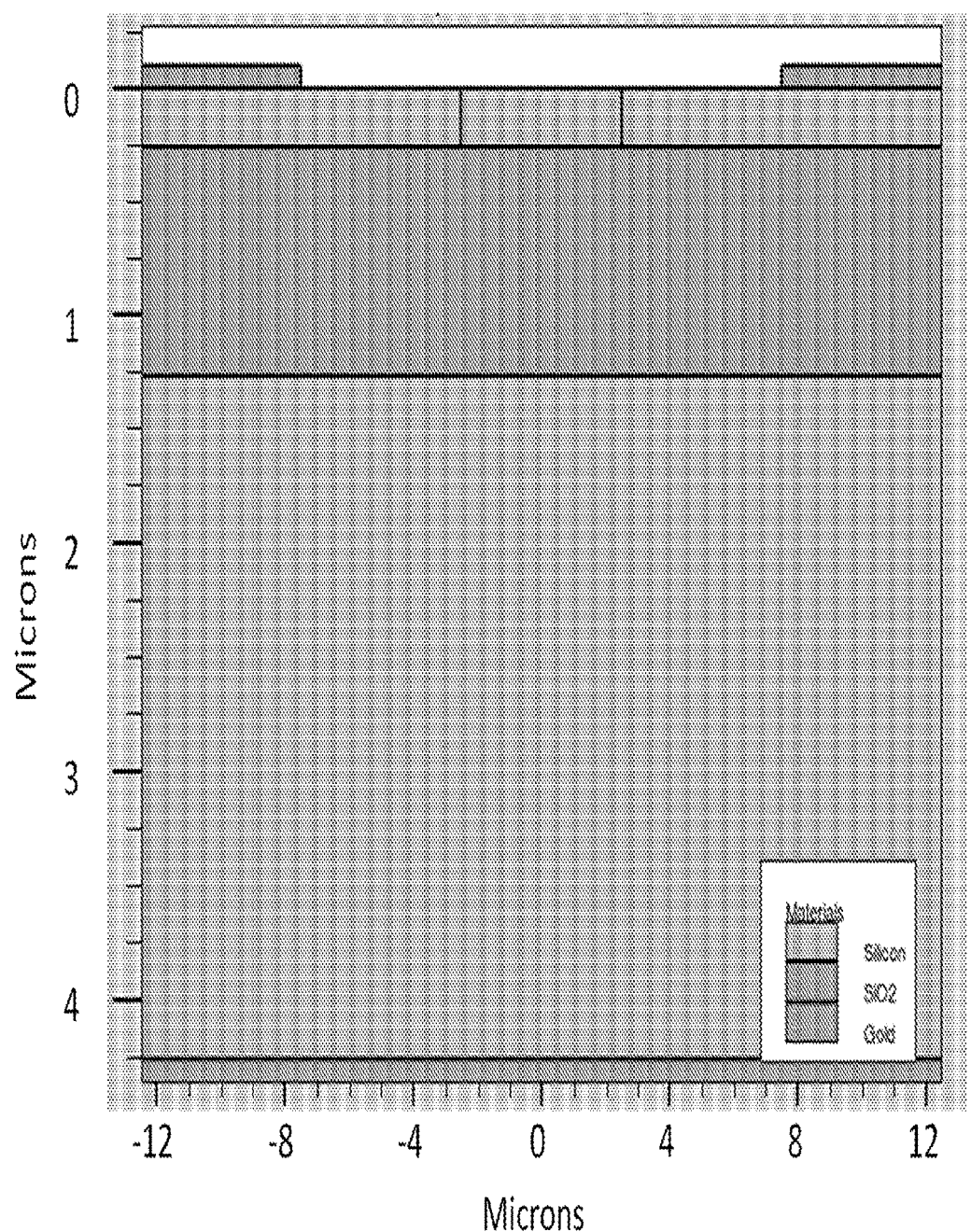
FIGS. 12A-12D illustrate simulated results from a directional photonic crystal routing element with a PIN diode.
Figure 12B:
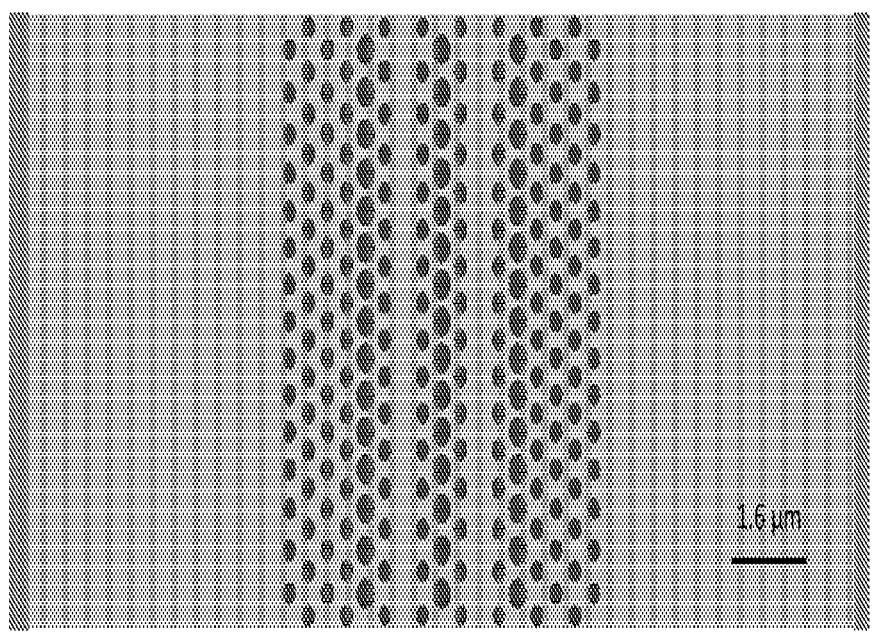
Figure 12C:
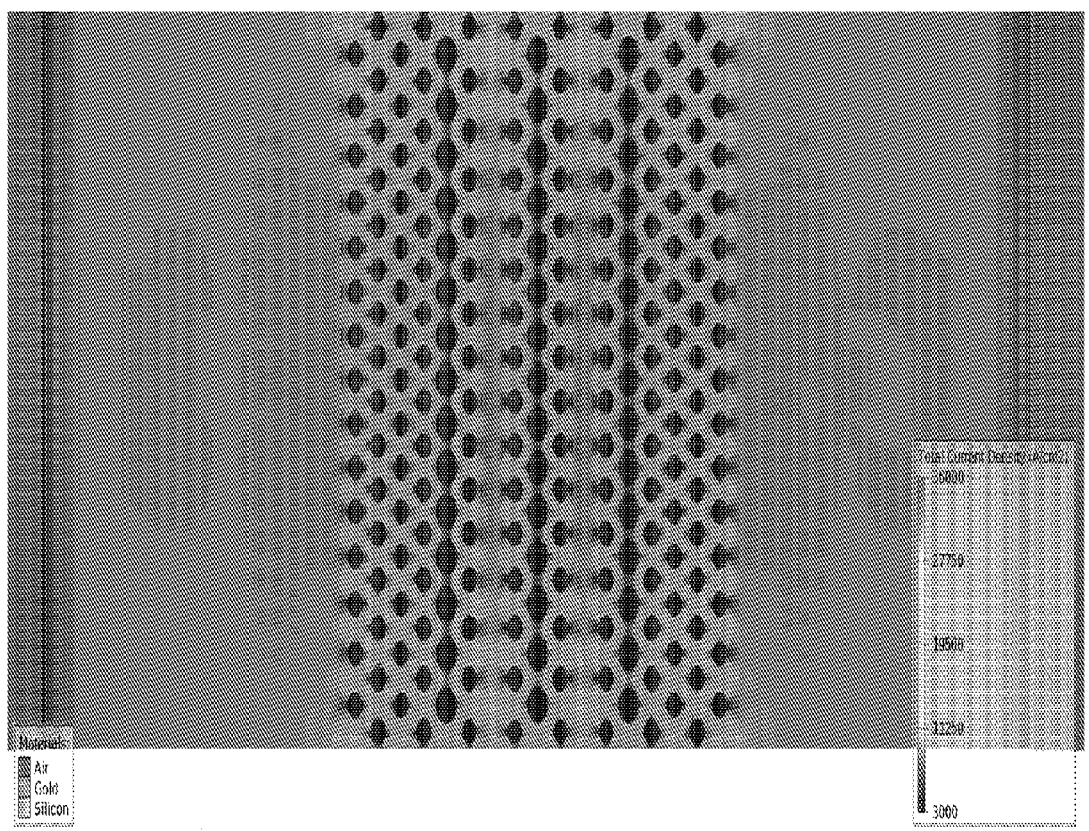
Figure 12D:
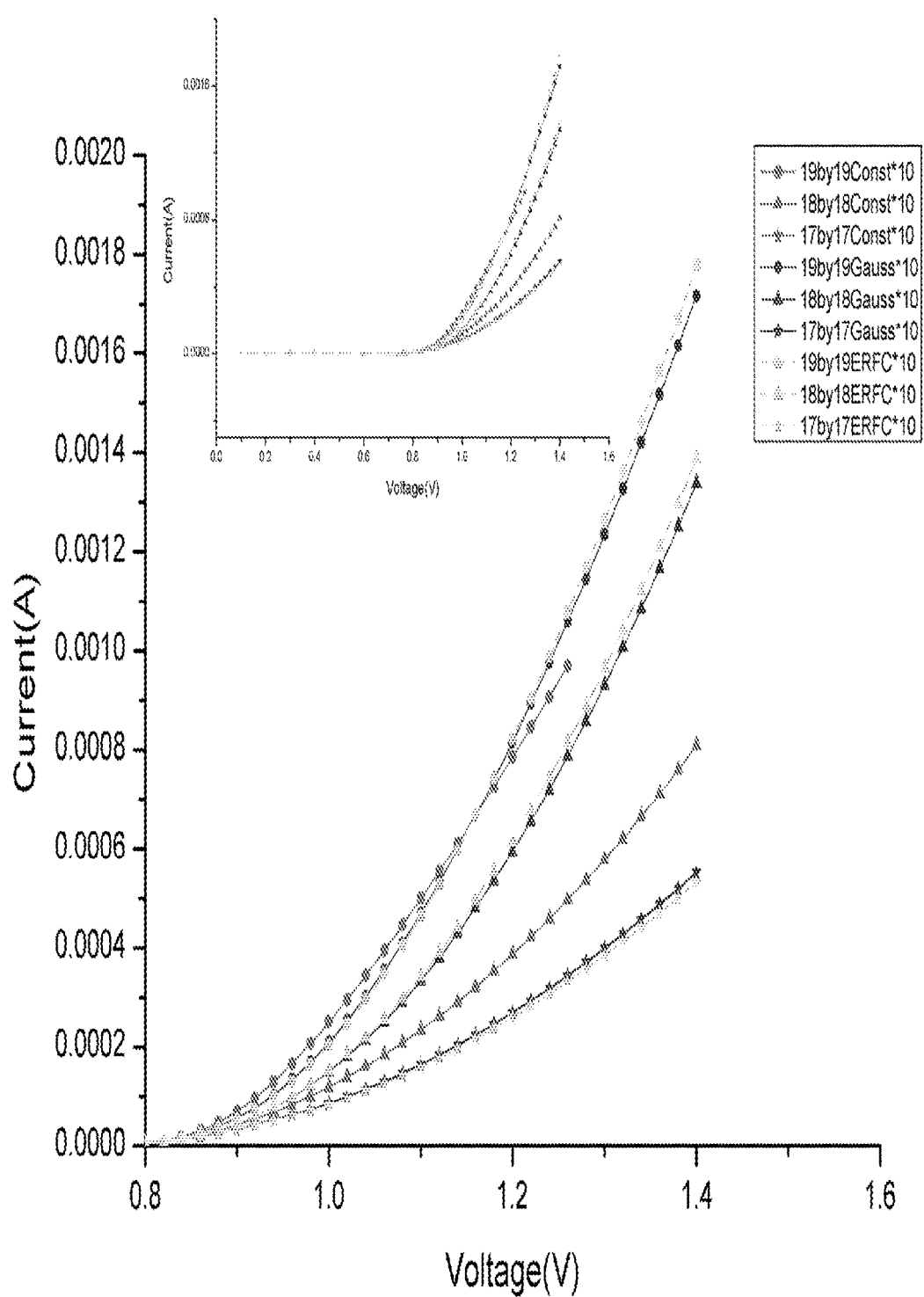

The design shown in FIG. 11 may need an extensive level of semiconductor device modeling to determine the optimal doping concentrations and doping profiles of the P and N regions, in order to minimize the electrical power needed to route the optical signal between the various output ports. Preferably, Phosphorous and Boron are used for the n-type and p-type dopants, respectively, with concentrations for each preferably in the range of $10^{18}$ to $10^{19}$ per cm$^{-3}$, and more preferably having a concentration of about $5\times10^{18}$ per cm$^{-3}$. A commercially available package (Silvaco™) was used for detailed analysis of the device used in an implementation. FIGS. 12A-12D illustrate snapshots of the Silvaco™ analysis as well as the current and charge distribution through the device. FIG. 12A illustrates a cross-sectional view of a routing element showing the P and N doping regions and approximate lateral doping profile that is to be fabricated. The vertical doping profile is preferably approximately uniform throughout. FIG. 12B illustrates a lateral cross sectional view of a routing element showing the intrinsic region. FIG. 12C illustrates the current density distribution in a routing element. FIG. 12D is a graph illustrating extracted I-V characteristics of simulated devices.

Figure 13A:
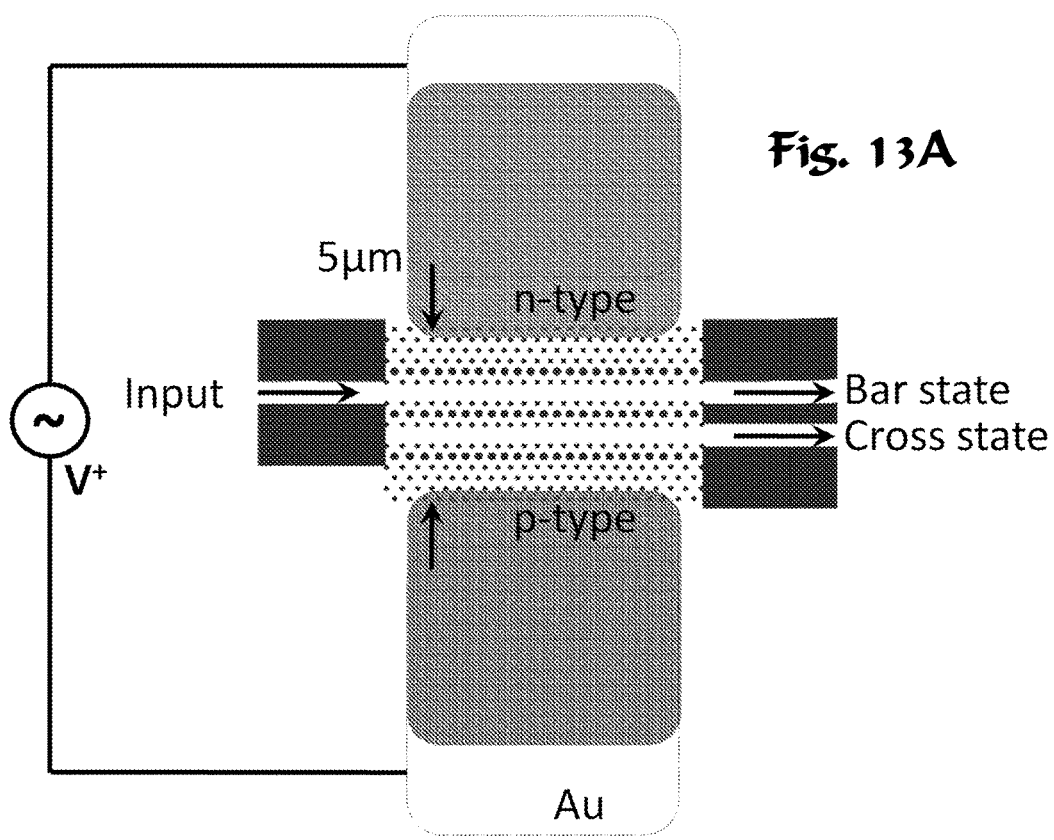
FIGS. 13A-13C illustrate the design of a directional photonic crystal routing element.
Figure 13B:
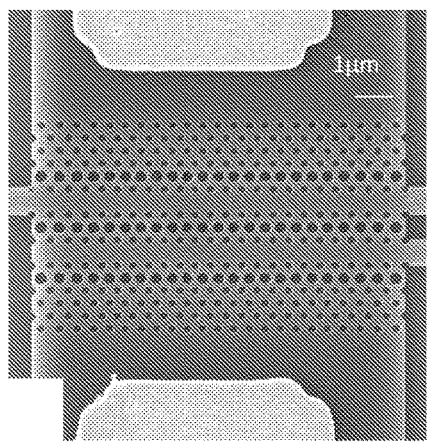
Figure 13C:
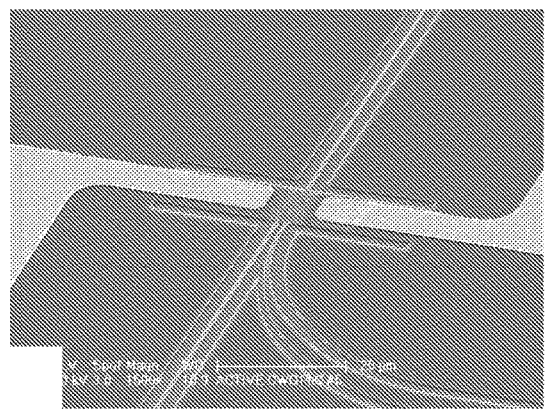
Figure 14:
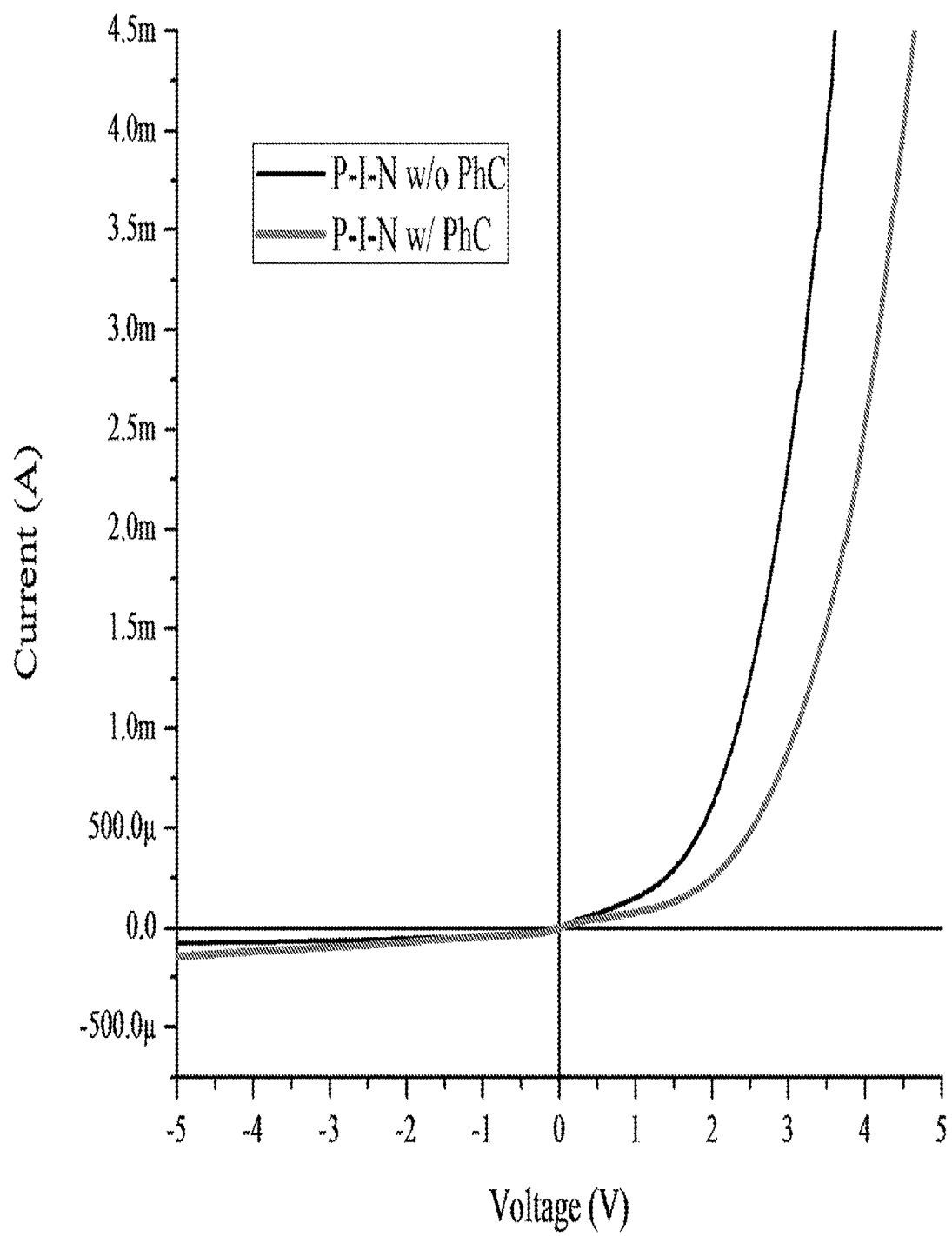
FIG. 14 illustrates the characteristics of a PIN diode when used with and without a directional photonic crystal routing element.

A directional routing element along with the PIN diode structure is shown in the design schematic of FIG. 13A. The gap between the P and N doping regions may be, e.g., 5 μm. The voltage across the PIN diode may be controlled by the voltage source, which may enable the output of the routing element to be selected between the bar port and the cross port. FIG. 13B shows images of an exemplary routing element that was constructed with a PIN diode. In this image, the P-doped region is at the top of the image, the N-doped region is at the bottom of the image, and the PhC is disposed between the two doped regions. FIG. 13C shows an image of silicon waveguides coupling in and out of an exemplary routing element on a SOI platform, with gold contacts forming circuit connections for the PIN diode. In FIG. 14, the performance of a PIN diode is compared with and without a PhC in the depletion region.

Design and Fabrication of Bi-Directional Optical Routers

Figure 15A:
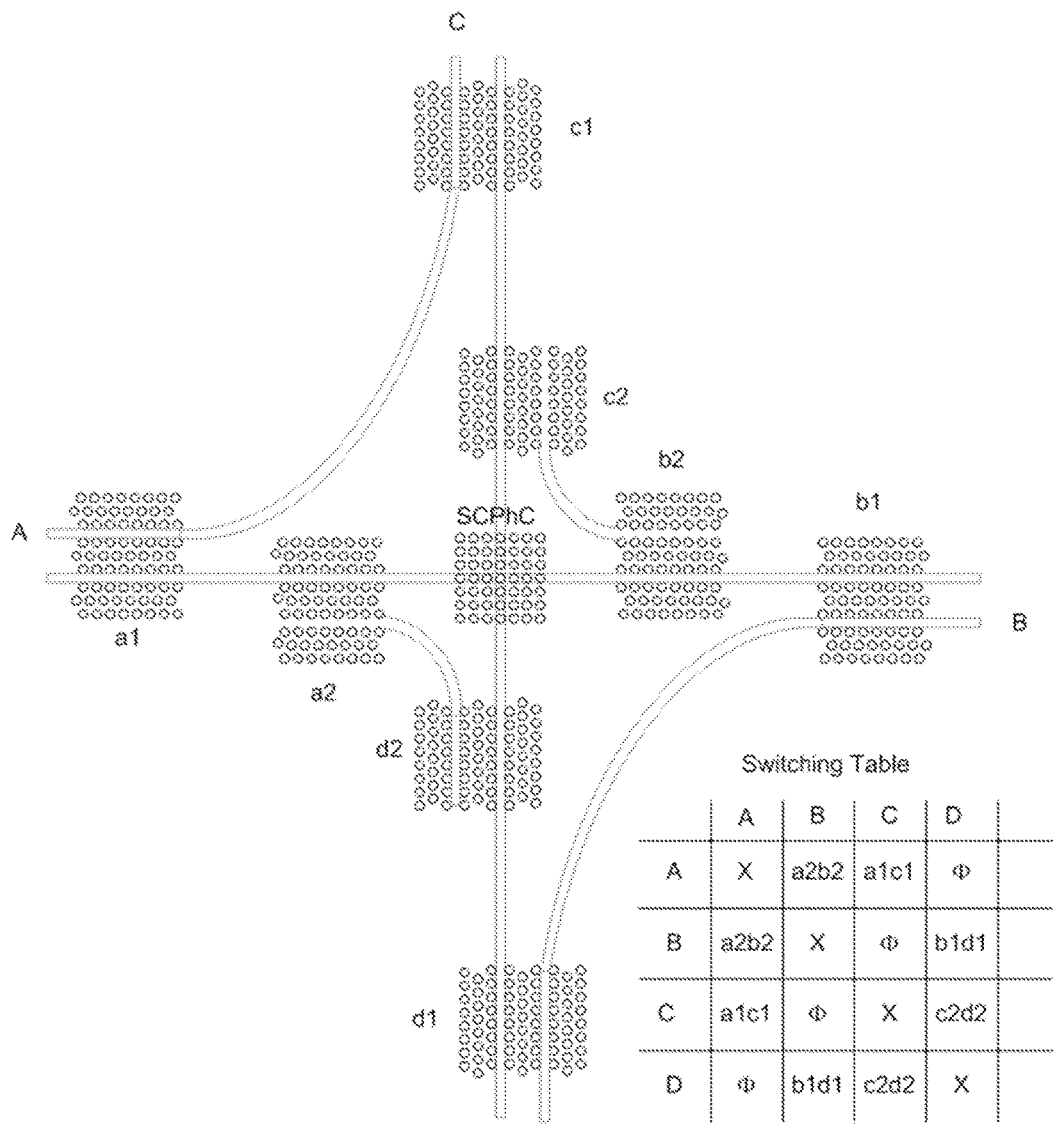
FIGS. 15A & 15B illustrate two different architectures for an optical router incorporating a plurality of bi-directional photonic crystal routing elements.
Figure 15B:
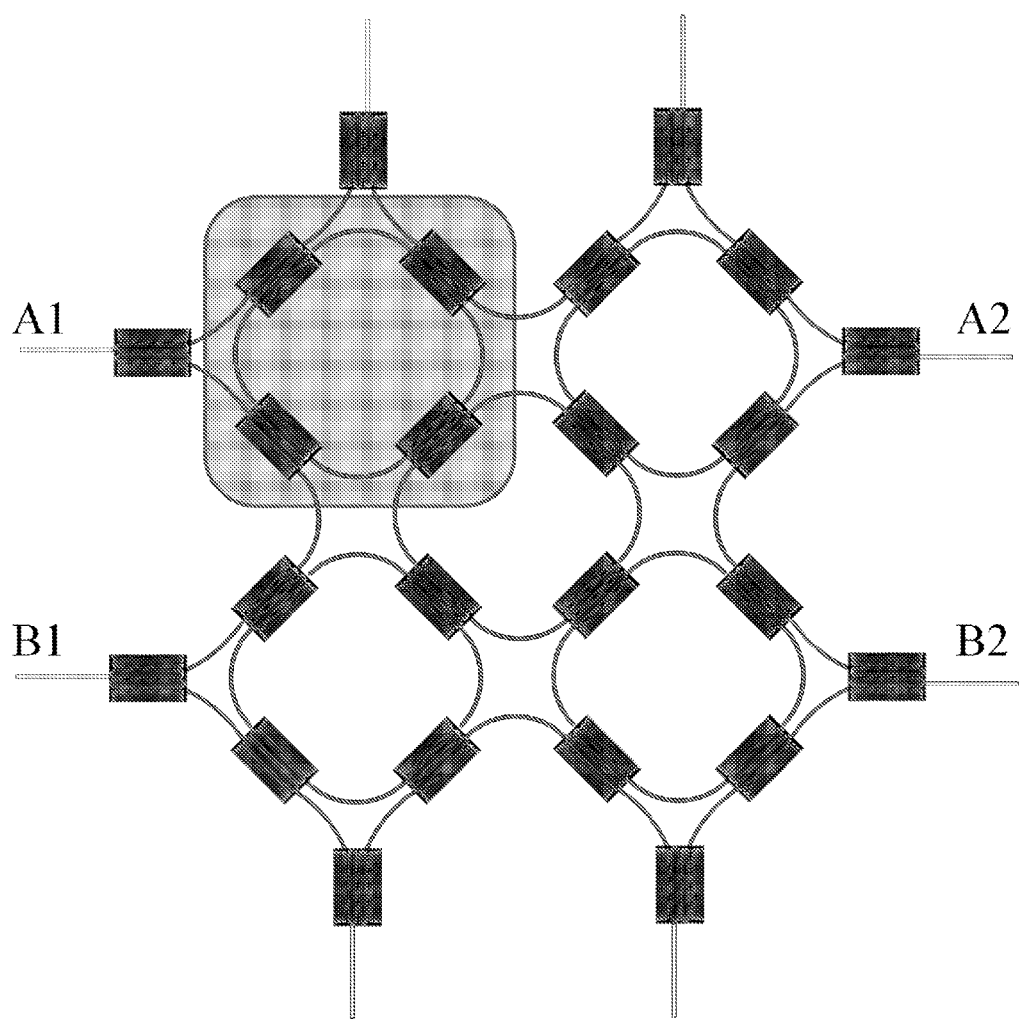

Given the bi-directional routing element, e.g., as shown in FIG. 1 several of these routing elements may be used as the basis for the design architecture of a bi-directional router. The architecture of two basic bi-directional routers, both of which may be used as a routing node for more complex routing fabrics, are shown in FIGS. 15A & 15B. Other types of routing nodes are possible, and the invention is not to be limited to these embodiments. FIG. 15A is based upon the well-known "Manhattan architecture", and FIG. 15B is based upon the well-known "honeycomb architecture". In either architecture, the optical signal between any adjacent or orthogonal ports can be redirected to any other port externally by modulating the coupling between the two waveguides of individual bi-directional routing elements. As such the optical signal can travel in either the forward, backward, upward or downward directions. This may provide an exceptional degree of reconfigurability.

Figure 16:
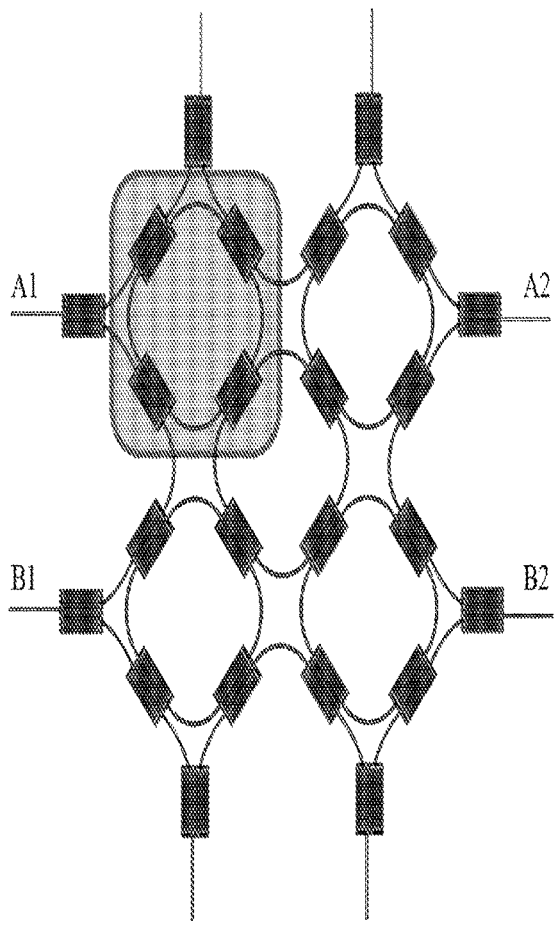
FIG. 16 illustrates an optical router and electrical and its optical routing performance.

The routing performance, switching table, and propagation loss for an example of a 2×2 routing fabric is shown in FIG. 16. In basic operation, an optical signal input at port A1 may pass through 4 elements to exit at port A2 and through 6 elements to exit at port B2. For the output at port A2, no routing elements may need to be ON, i.e., outputting optical energy at the bar port. For the output at port B2, only two routing elements, minimally, may need to be ON, which in an exemplary embodiment, may consume approximately 1 mW of total electrical power to attain this path and may incur a cost of approximately 0.24 dB of total optical loss.

Figure 17:
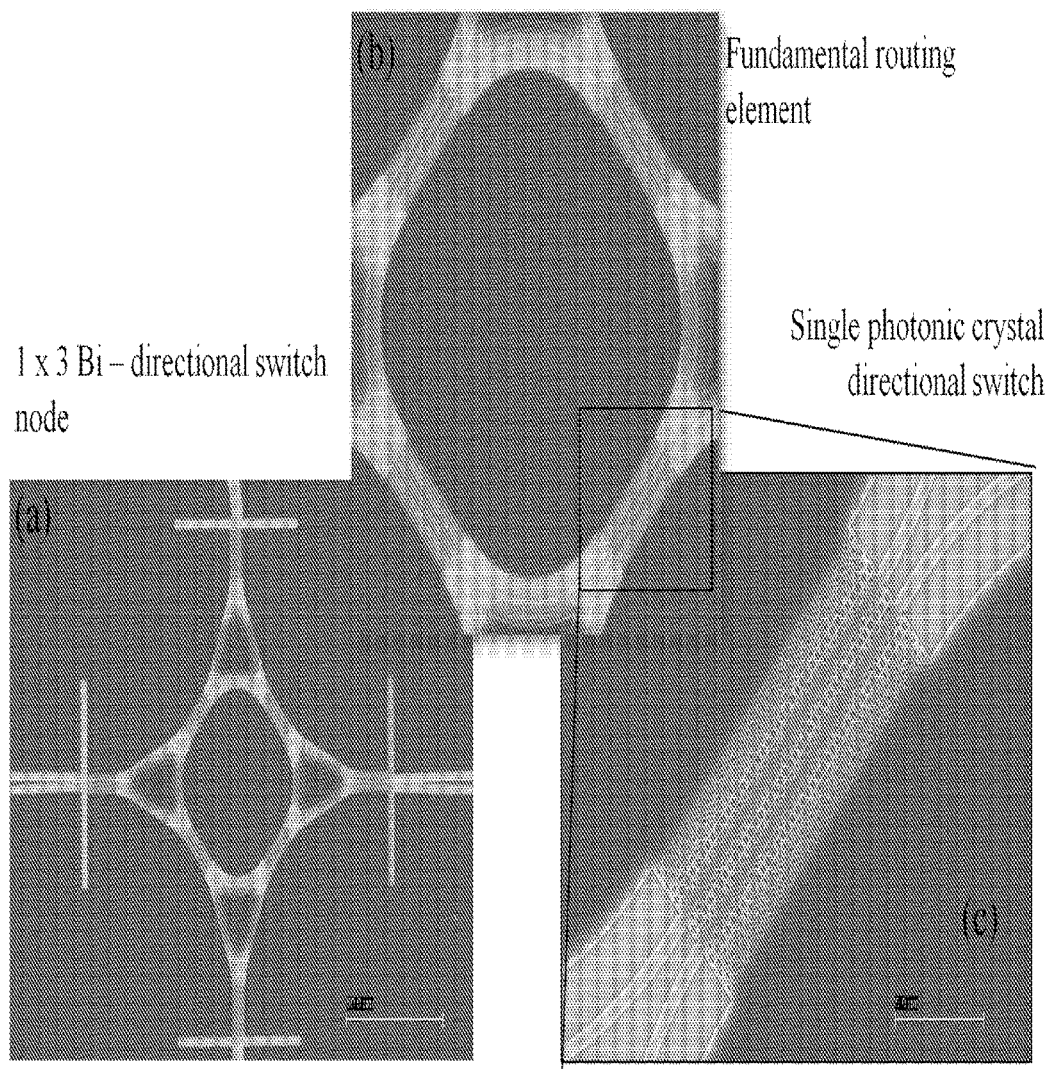
FIG. 17 shows images of a bi-directional optical router.

A prototype of a 1×3 bi-directional routing node was fabricated, as is shown photographically in FIG. 17. The node shown in photo (a) may allow an optical signal to be incident upon the routing fabric at any one of the four ports, and may route the signal to any other of the three remaining ports. Photo (b) shows a single fundamental routing fabric element of the routing fabric, which can be structured to an m×n array. Each fundamental routing fabric element may consist of four photonic crystal elements joined by bending silicon nanowire waveguides. Photo (c) shows that the PhC routing element may utilize the input and output of each line defect waveguide, which may allow each element to be bi-directional from every waveguide incident on the routing element. The density of the routing elements within the fabric may be easily adjusted by changing the bending radius of the nanowire waveguides, either to space out or condense the device footprint on a chip. In the fabricated prototype, the approximate lateral and vertical dimension of the routing fabric element is 50 μm. Property and design highlights that may be achieved from such a routing fabric are listed in Table 1.

TABLE 1

Properties exhibited by an example routing fabric

| | |
|---|---|
| Routing unit cell (node) dimensions | 50 μm × 50 μm |
| Number of routing elements per unit cell | 4 |
| Propagation loss per routing element | $4 \times 10^{-2}$ dB/element |
| Switching (routing) power per | 1 mW |

TABLE 1-continued

Properties exhibited by an example routing fabric

| routing element | |
|---|---|
| Pulse dispersion | 1.5 ps nm$^{-1}$ mm$^{-1}$ |
| Free dispersion rate | Up to 160 Gb/s |
| Routing speed | 500 ns per element |
| Extinction ratio | −17 dB |
| Routing channel spacing | 4 nm for routing element of 16a coupling length |
| | 2 nm for routing element of 36a coupling length |
| | 0.8 nm for routing element of 108a coupling length |
| | 0.4 nm for routing element of 162a coupling length |

Figure 18A:
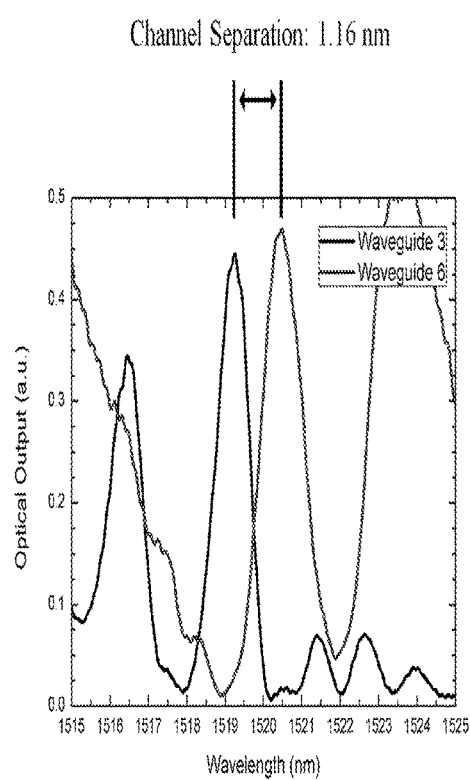
FIGS. 18A and 18B illustrate experimental set-up and transmission results for a bi-directional optical router.
Figure 18B:
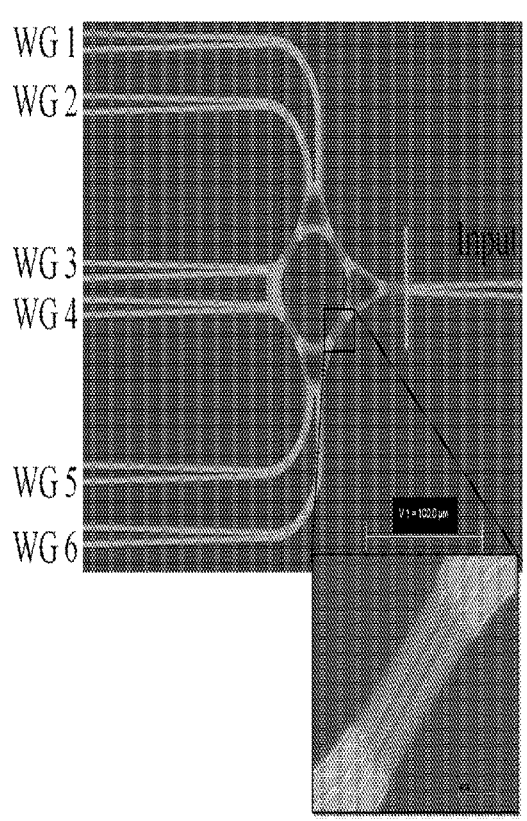
Figure 19:
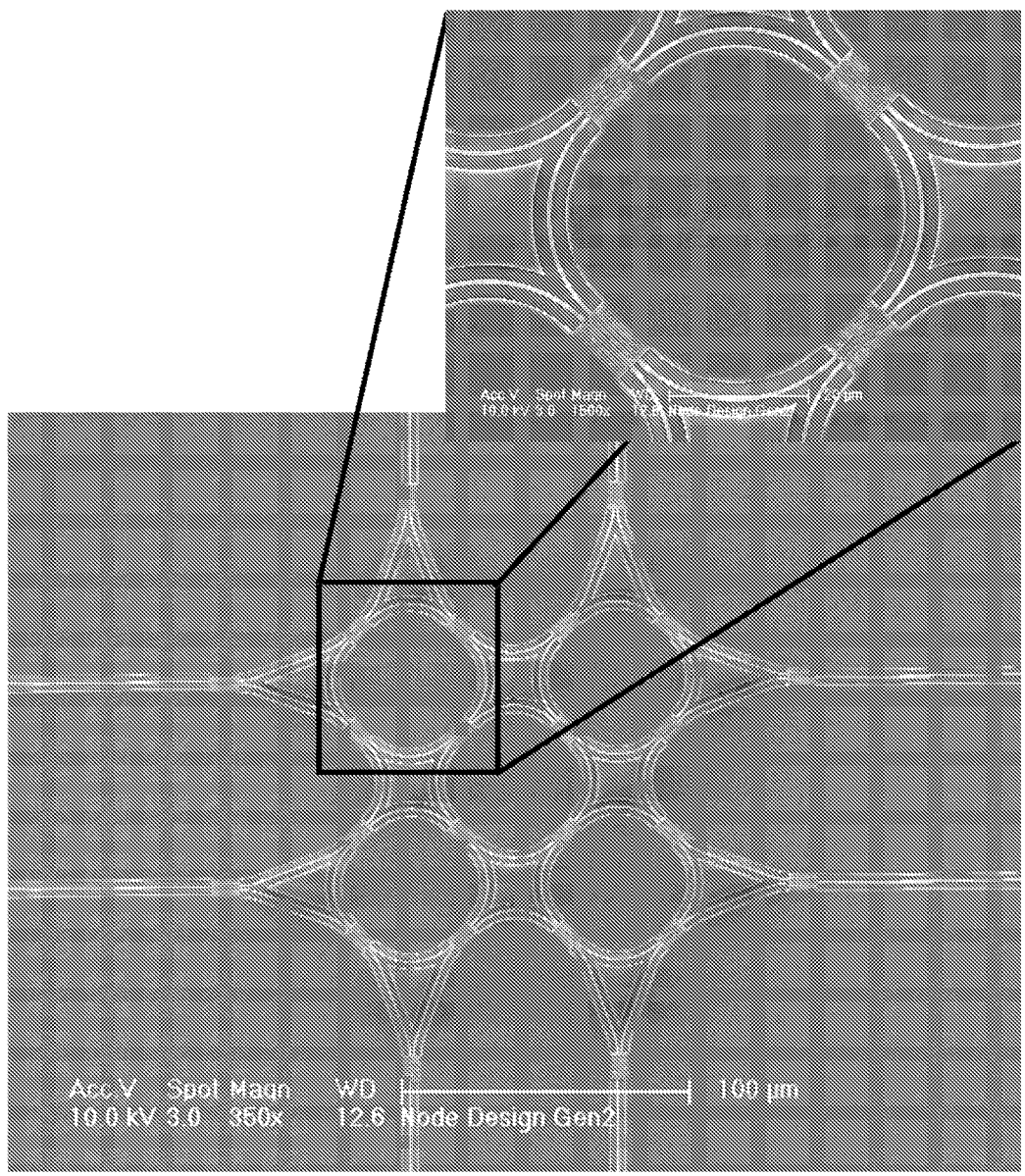
FIG. 19 shows an image of an eight port bi-directional optical router.

To passively characterize a routing node, the exemplary routing node pictured in FIG. 18A was constructed to allow monitoring of all possible output channels represented by waveguides (WG) 1-6. Spectral scans were performed by launching an optical signal into the input nanowire waveguide, and monitoring each output waveguide individually. The spectral characterization showed the optical signal was appropriately routed to waveguides WG3 and WG6 for their corresponding channels, maintaining a comparable performance of the single routing element with a channel separation of 1.16 nm and an average extinction ratio of about −12 dB. The measured outputs of WG3 and WG6 are shown in FIG. 18B. The remaining 4 probed waveguides remained a minimum of −17 dB below the channels optical signal strength. With this demonstration of acceptable single-node performance, the 8 port routing fabric shown in the photo of FIG. 19 was fabricated using 4 routing nodes. As is explained below, the 8 port routing fabric also performed as expected, and it is anticipated that routing fabrics with greater numbers of nodes, whether of similar architecture or having significantly different architecture, but using the same basic routing element as the primary building block, could be constructed using these same principles.

The network configurations and topologies presented below can be implemented for the cases of a single incoming fiber carrying N different wavelength channels, or an N fiber ribbon carrying a number of N different wavelength channels.

For an N port router, there are $$\prod_{i=0}^{(\frac{N}{2}-1)} (N - 1 - 2i)$$

ways to interconnect N-ports.

Figure 20:
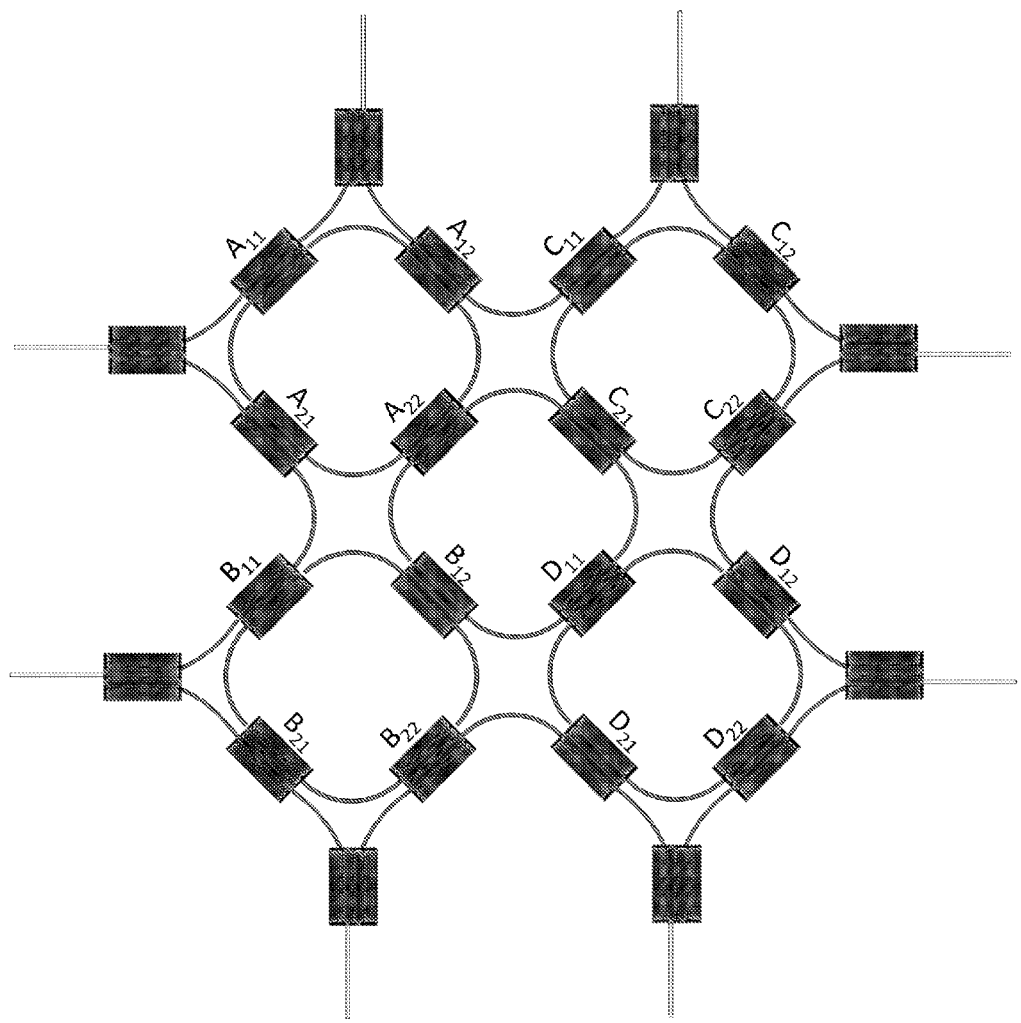
FIG. 20 illustrates a schematic diagram of the eight port bi-directional optical router shown in FIG. 19.
Figure 21A:
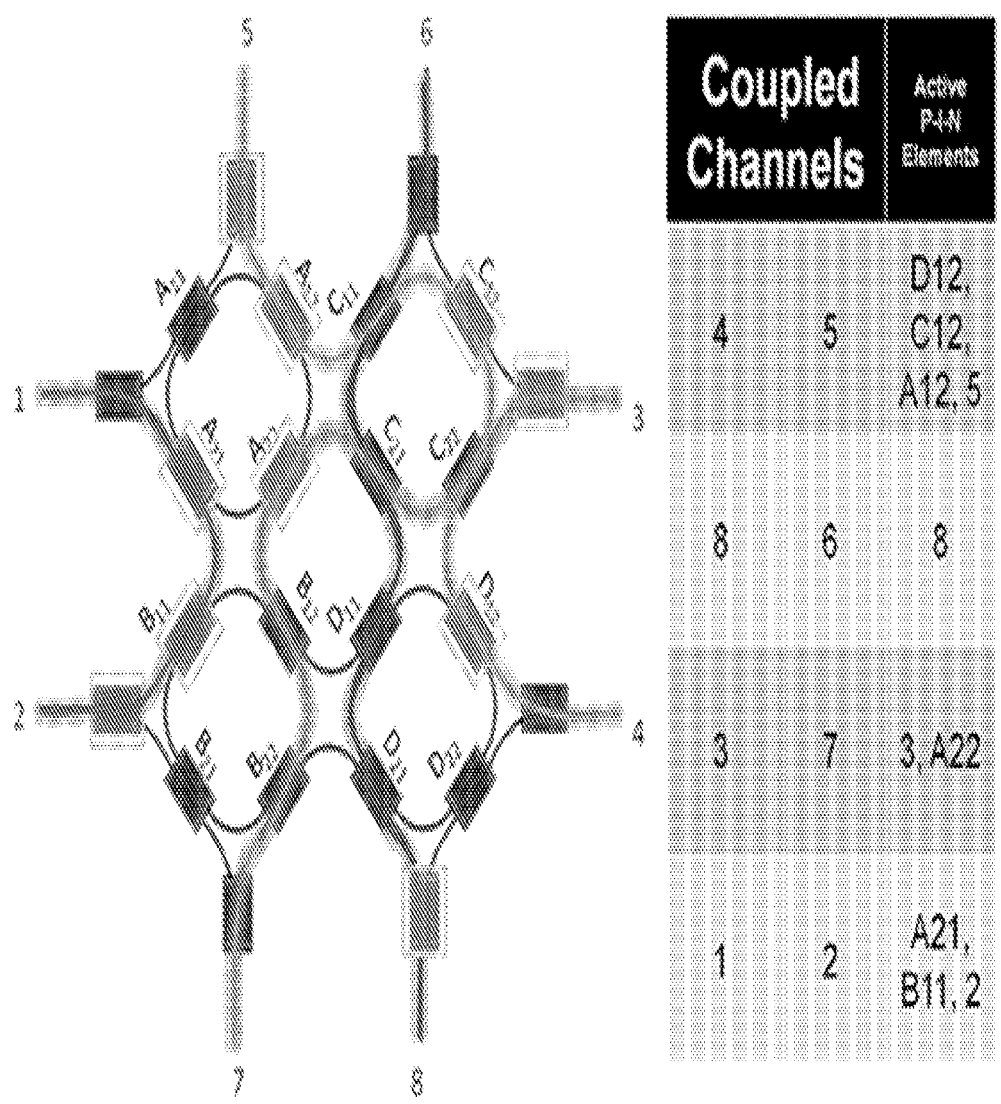
FIGS. 21A-21D illustrate four different routing options for an eight port bi-directional optical router.
Figure 21B:
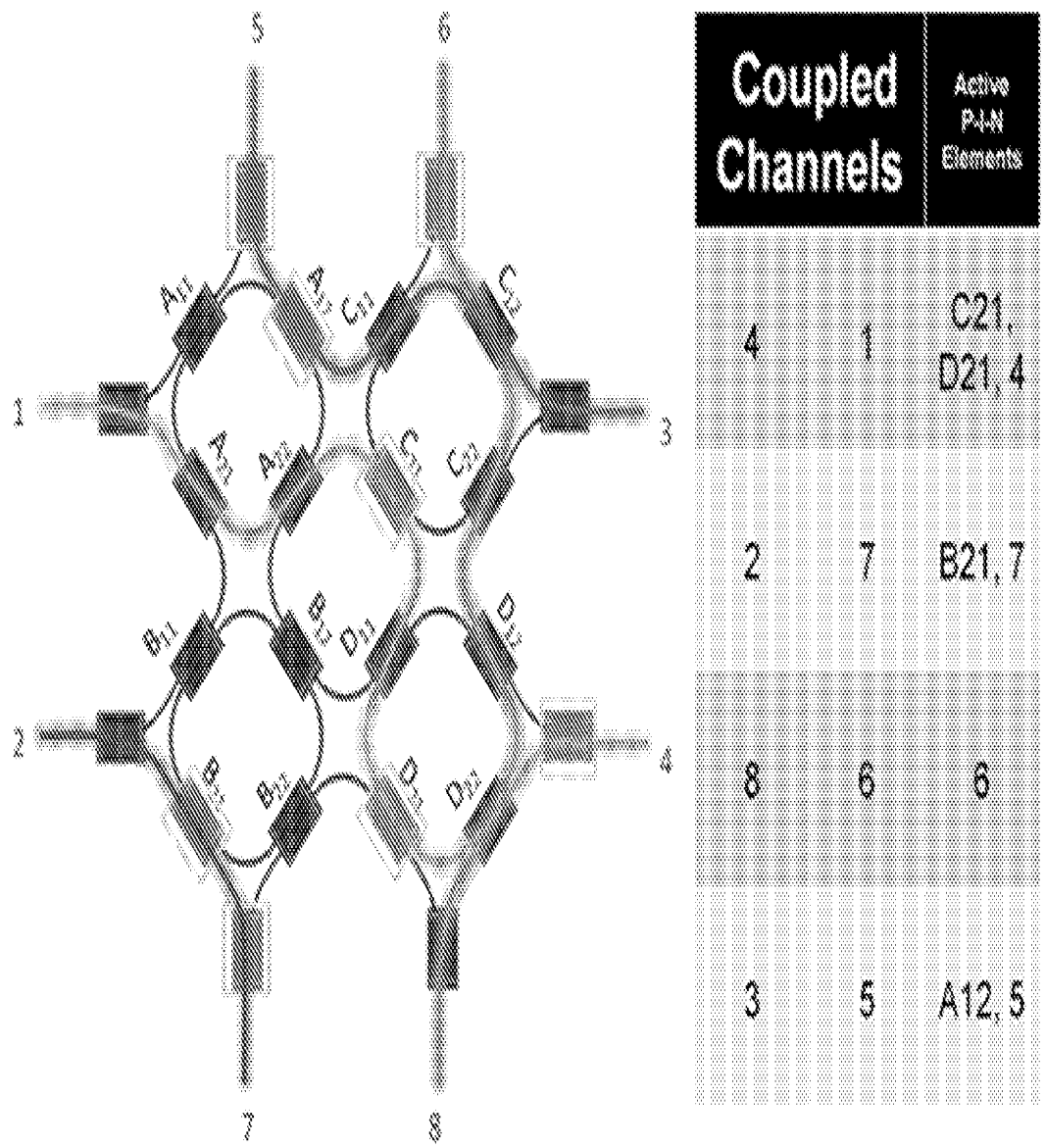
Figure 21C:
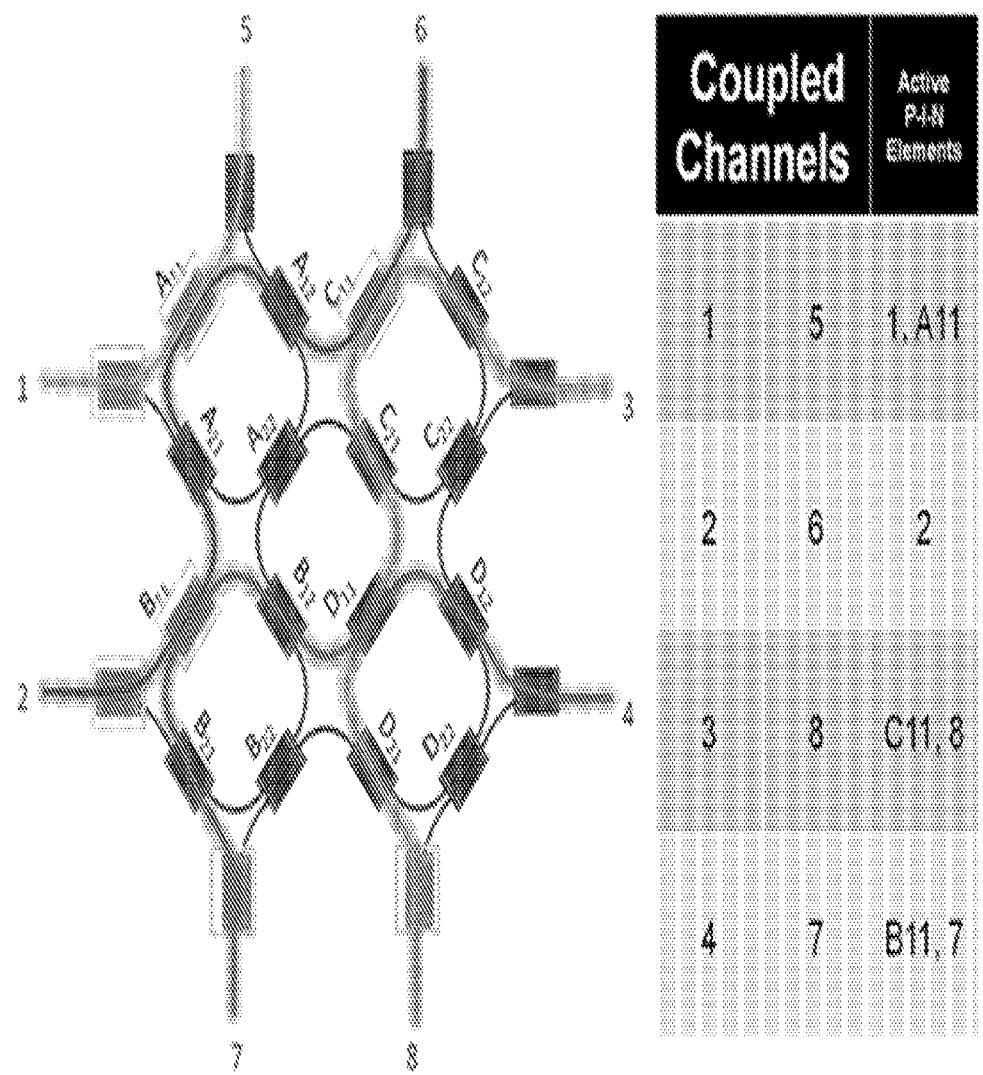
Figure 21D:
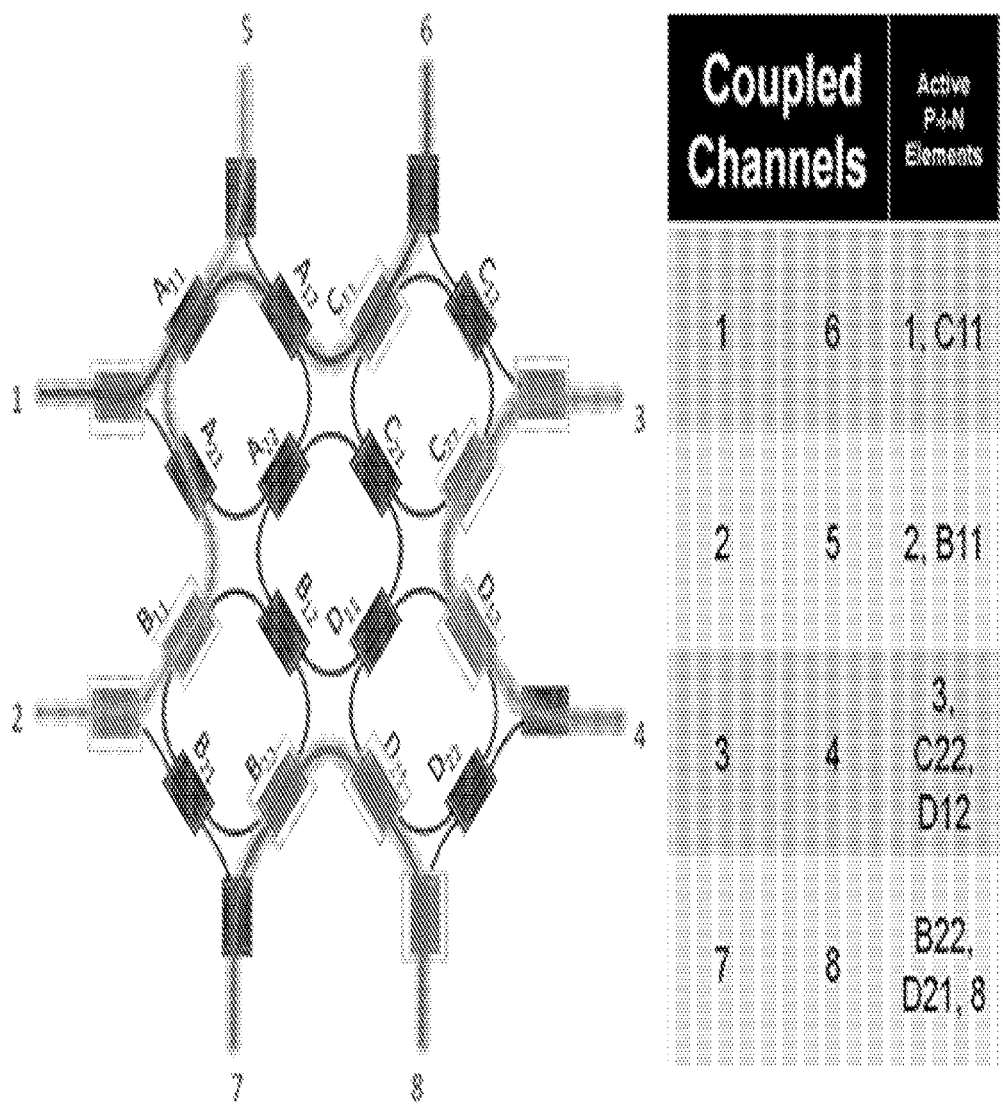

Therefore for N=8 there are 7×5×3=105 ways to connect an 8 port routing fabric. A conceptual design of an 8 port routing fabric, with port and element labeling, is shown in FIG. 20. FIGS. 21A-21D illustrate 4 possibilities out of the 112 ways to interconnect the 8 port routing fabric shown in FIG. 20. Each of these four different configurations may simultaneously interconnect 4 pairs of the available 8 ports. In each configuration, the routing elements in the ON state are listed in the column adjacent the listed pair of ports. With these select routing elements in the ON state, a pathway between the two indicated ports may be created for each configuration.

Figure 22:
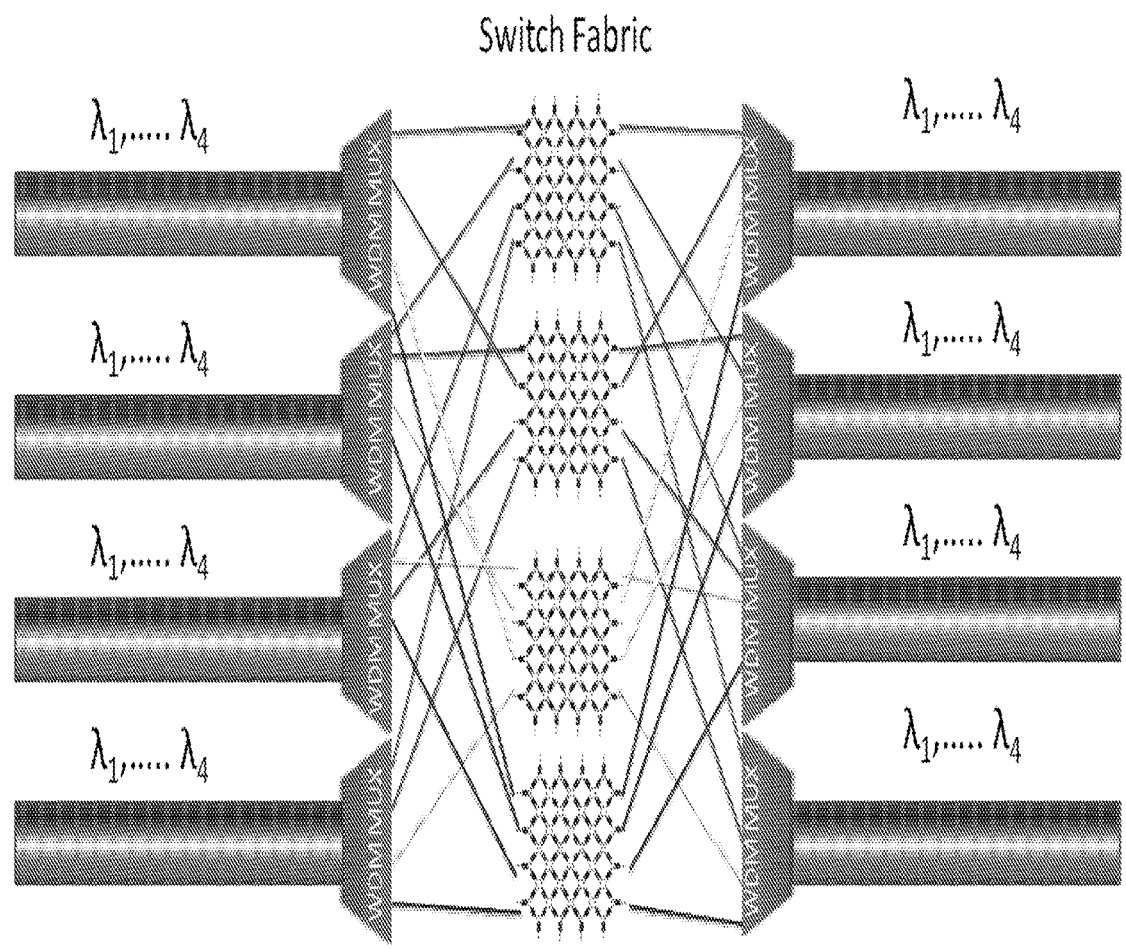
FIG. 22 illustrates a reconfigurable optical cross-connect system utilizing bi-directional optical routers.

An optical crossconnect system in a reconfigurable optical network is illustrated in FIG. 22, which is an example of an optical crossconnect system utilizing a number of 16 port routing fabrics. Each routing fabric may interconnect an input from one of four channels within the optical network to any one of another four channels within the optical network.

Figure 23:
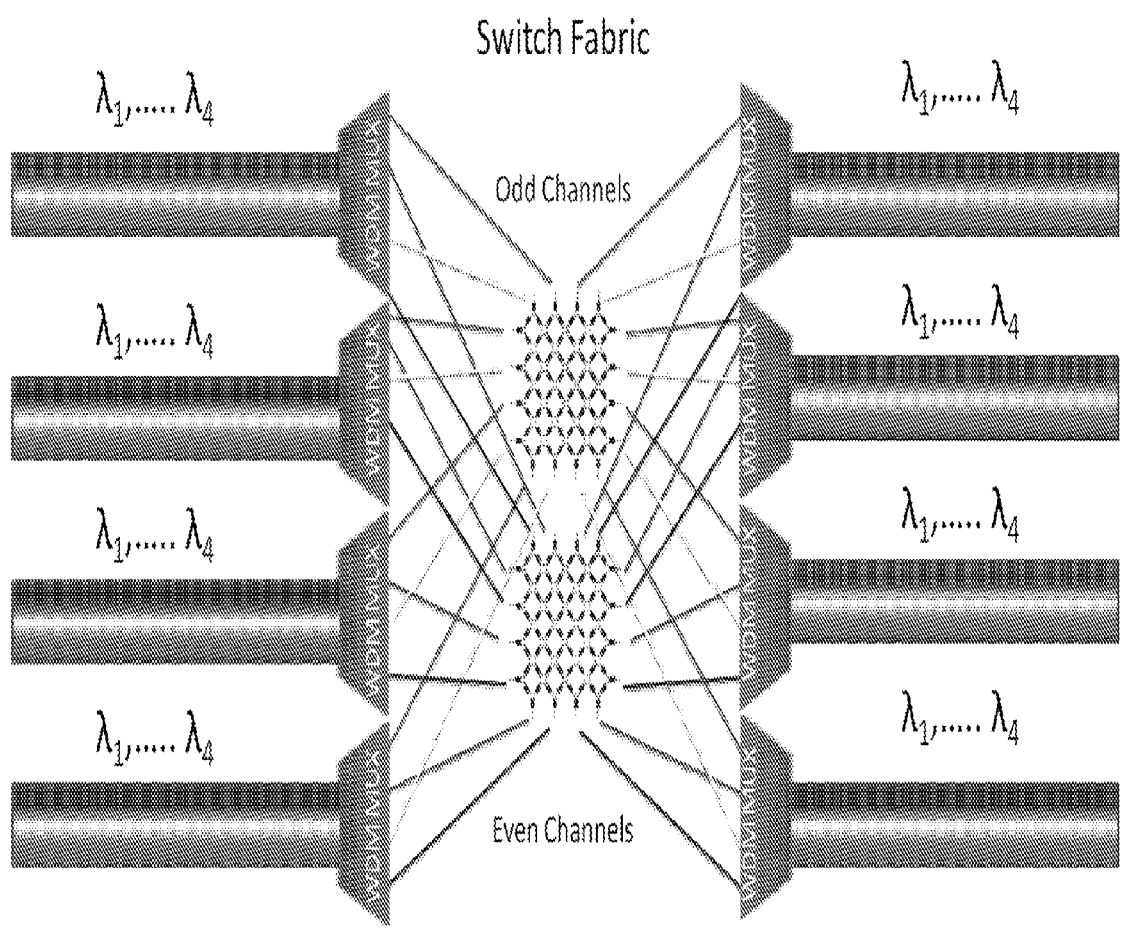
FIG. 23 illustrates a parity based reconfigurable optical cross-connect system utilizing bi-directional optical routers.

An example of a parity-based optical crossconnect system in a reconfigurable optical network is illustrated in FIG. 23. This alternative to the system shown in FIG. 22 divides the incoming channels into odd and even channels and routes each channel based on its parity.

Figure 24:
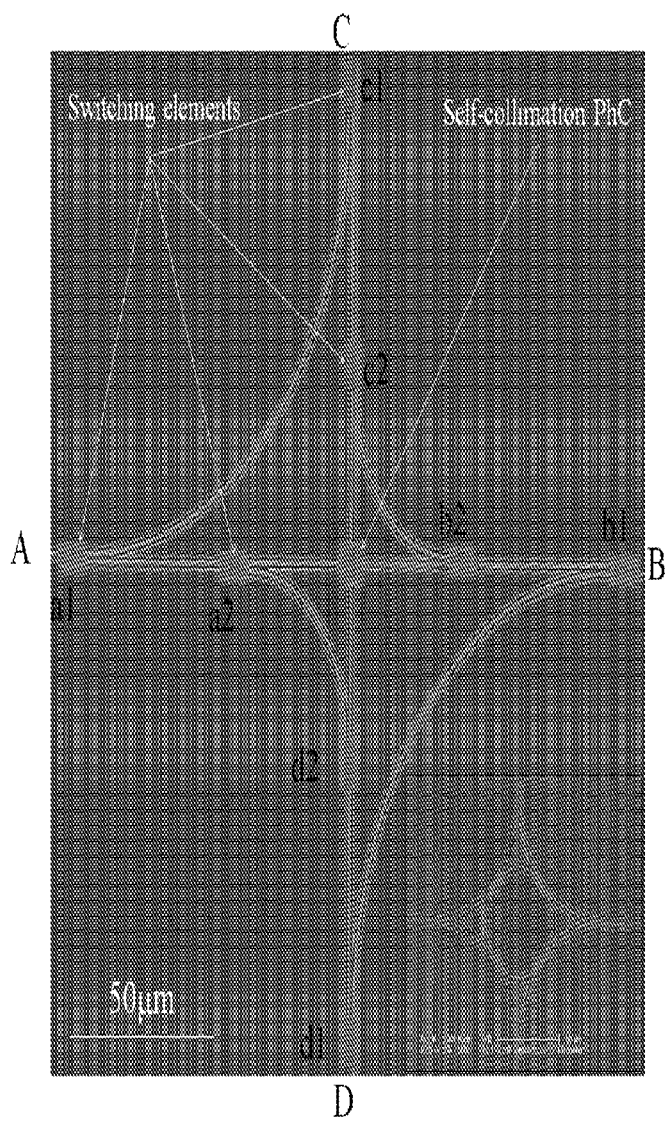
FIG. 24 shows an image of an optical switch node which may be incorporated into an optical FPGA.
Figure 25:
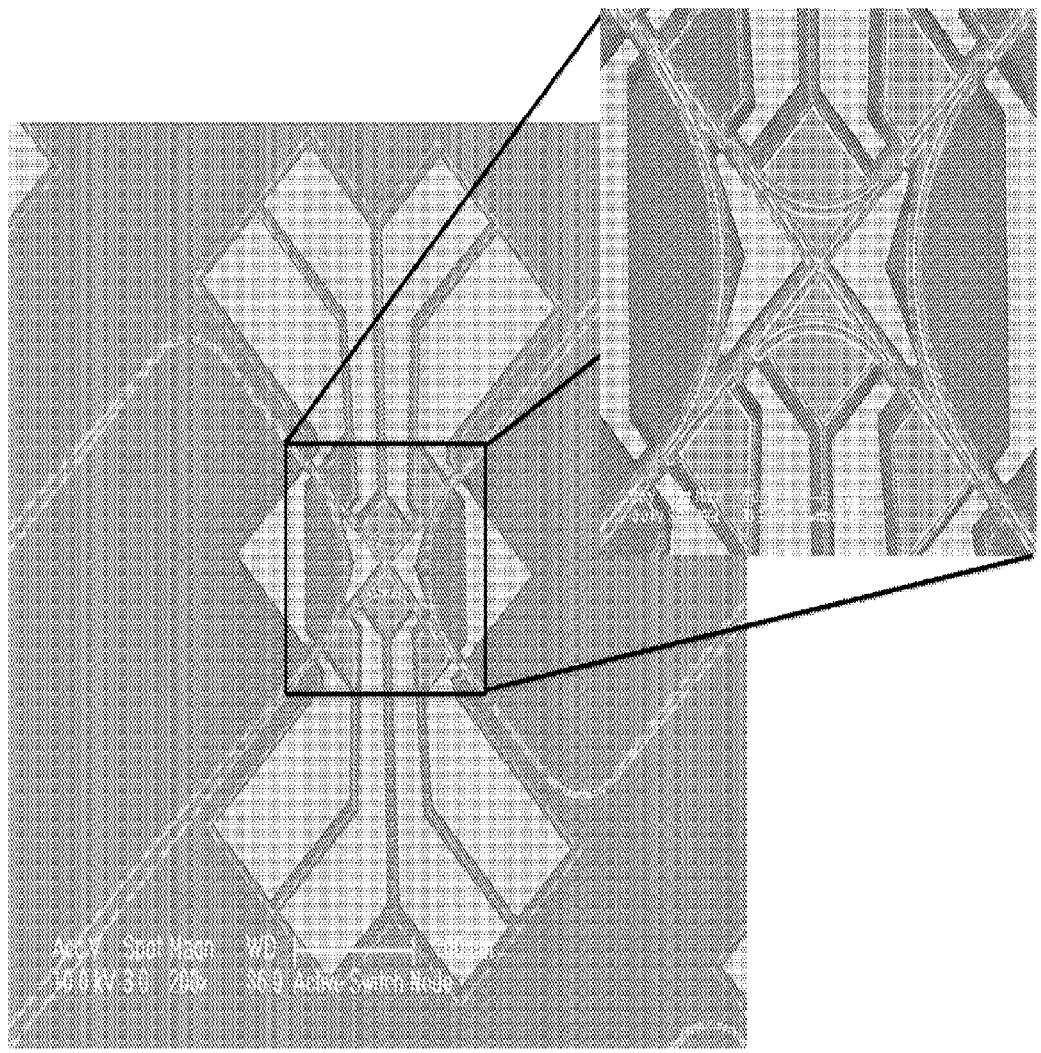
FIG. 25 shows an image of a fabricated switch node with PIN diodes and electrical contacts.

The routing element can further be implemented into a larger design as a switch in an optical routing fabric. For example, the switch node, shown in the photo of FIG. 24 alongside a switching table, has the functionality to route an optical signal as a 1×3 directional switch. The switch node may be symmetric, allowing it to be replicated in a n×m array to form a large switch fabric that can function as an optical FPGA and perform operations such as routing, logic, integration and buffering. Although, with the freedom to choose the size of the array, it does not necessarily mean that if more ports in the array are needed, a 2D chip layout can accommodate the extra real estate required. As device densities continue to increase on chips, the ability to be released from the restrictions of photonic devices structured in a 2D substrate can allow for a new 3D photonic chip architecture by layering devices and building vertically on the chip. An alternative fabricated switch node is shown in the photos of FIG. 25, which also illustrates the PIN diode electrical contacts.

Thus, an optical signal router, both as a single optical signal routing element and as a plurality of interconnected optical signal routing elements, may be provided. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. An optical signal router comprising:
   a plurality of router input/output ports of the optical signal router each configured to connect to a corresponding external waveguide to optically communicate therewith; and
   an array of optical routing nodes interposed between the plurality of router input/output ports to selectively route optical signals between pairs of the router input/output ports, each optical routing node comprising:
      four bi-directional optical switches including a first bi-directional optical switch, a second bi-directional optical switch, a third bi-directional optical switch and a fourth bi-directional optical switch, each of the four bi-directional optical switches comprising a first switch input/output port, a second switch input/output port, a third switch input/output port and a fourth switch input/output port, each bi-direction optical switch configured to receive a first optical signal via either of the first and second switch input/output ports and output the first optical signal via a selected one of the third and fourth switch input/output ports, and configured to receive a second optical signal via either of the third and fourth switch input/output ports and to output the second optical signal via a selected one of the first and second switch input/output ports,
      at least a portion of each of eight input/output waveguides, each of the eight input/output waveguides shared with and directly connected to either a neighboring optical routing node of the array of optical routing nodes or a router input/output port of the plurality of router input/output ports to provide a corresponding bi-directional optical signal path therebetween, each of the eight input/output optical waveguides directly connected to a corresponding one of the first and third switch input/output ports of the four bi-directional optical switches, and four internal optical waveguides, each of the four internal optical waveguides directly connected to a second switch input/output port of one of the four bi-directional optical switches to a fourth switch input/output port of a neighboring one of the four bi-directional optical switches to provide a bi-directional optical signal path therebetween, the four internal optical waveguides and the four bi-directional optical switches thereby being connected to provide a bi-directional first closed loop optical signal path internal to the optical routing node, whereby the optical signal router is configurable to provide plural optical signal paths between selected pairs of the router input/output ports in response to a selected configuration of each bi-directional optical switches to simultaneously transmit optical signals between the selected pairs of the router input/output ports on the plural optical signal paths.

2. The optical signal router of claim 1, wherein each of the bi-directional optical switches comprises a connection to receive an electrical signal and is responsive to the electrical signal to optically connect one of the first and second switch input/output ports to a selected one of the third and fourth switch input/output ports.

3. The optical signal router of claim 2, wherein each of the bi-directional optical switches is responsive to the electrical signal having a first state to optically connect one of the first and second switch input/output ports to one of the third and fourth switch input/output ports and responsive to the electrical signal having a second state to optically connect the one of the first and second switch input/output ports to the other one of the third and fourth switch input/output ports.

4. The optical signal router of claim 3, wherein the optical signal router is reconfigurable to provide different optical signal paths between different selected pairs of the router input/output ports in response to a different selected configuration of each bi-directional optical switches to simultaneously transmit optical signals between the different selected pairs of the router input/output ports on the different provided optical signal paths.

5. The optical signal router of claim 3, wherein each of the bi-directional optical switches comprise a photonic crystal including a first internal waveguide extending between the first switch input/output port to the third input/output port and a second internal waveguide extending between the second switch input/output port and the fourth switch input/output port and adjacent to the first internal waveguide, wherein the bi-directional optical switch is responsive to an external electrical input to selectively prevent or cause light transmitted along the first and second internal waveguides to be transmitted along the other of the first and second internal waveguides.

6. The optical signal router of claim 3, wherein, with respect to a top down view, the array of optical routing nodes is arranged as a two dimensional (2D) array, and the plurality of router input/output ports are arranged on a top side, a bottom side, a left side and a right side of the two dimensional array.

7. The optical signal router of claim 6, wherein the optical signal router is configurable to provide an optical signal path between each possible pair of the router input/output ports.

8. The optical signal router of claim 6, wherein the optical signal router is configurable to simultaneously provide a first optical signal path between a router input/output port on the bottom side of the 2D array and on the top side of the 2D array and to provide a second optical signal path between a router input/output port on the left side of the 2D array and the right side of the 2D array.

9. The optical signal router of claim 8, wherein the optical signal router is configurable to provide a third optical signal path between two router input/output ports on a same side of the 2D array simultaneously with the providing of the first optical signal path and the second optical signal path.

10. The optical signal router of claim 6, wherein the optical signal router is configurable to provide a third optical signal path between two router input/output ports on a same side of the 2D array.

11. The optical signal router of claim 6, wherein the optical signal router is formed in a semiconductor chip.

12. The optical signal router of claim 11, wherein the four internal optical waveguides and eight input/output waveguides of each of the optical routing nodes are silicon waveguides of each of the optical routing nodes.

13. The optical signal router of claim 12, wherein each of the optical bi-directional optical switches of each of the optical routing nodes comprise a PIN diode configured to selectively couple internal waveguides of the optical bi-directional optical switch.

14. The optical signal router of claim 11, wherein the semiconductor chip is an optical field programmable gate array (FPGA).

15. The optical signal router of claim 11, wherein each of the bi-directional optical switches comprise a photonic crystal including a first internal waveguide extending between the first switch input/output port to the third input/output port and a second internal waveguide extending between the second switch input/output port and the fourth switch input/output port and adjacent to the first internal waveguide, wherein the bi-directional optical switch is responsive to an external electrical input to selectively prevent or cause light transmitted along the first and second internal waveguides to be transmitted along the other of the first and second internal waveguides.

16. The optical signal router of claim 15, wherein photonic crystal of each bi-directional optical switches comprises a slow light characteristic.

17. The optical signal router of claim 11, wherein each optical signal router node is formed within a 50 um×50 um area of the semiconductor chip.

18. The optical signal router of claim 17, wherein each of the optical switches is formed within a 10 um×5 um area of the semiconductor chip.

19. The optical signal router of claim 11, wherein an input power for routing is less than 1 mW per bi-directional optical switch.

20. The optical signal router of claim 1, wherein each optical signal router node is formed within a 50 um×50 um area and each of the optical switches is formed within a 10 um×5 um area.

21. The optical signal router of claim 1, wherein each router input/output port comprises an optical switch connected to a corresponding external waveguide at a first side of the router input/output port and to a corresponding optical routing node at a second side of the router input/output port.

22. The optical signal router of claim 21, wherein each router input/output port is connected to the corresponding optical routing node at the second side of the router input/output port via two of the eight input/output waveguides of the corresponding optical routing node to two different ones of the four bi-directional optical switches of the corresponding optical routing node.

23. The optical signal router of claim 1, wherein each of the four internal optical waveguides and eight input/output waveguides of each optical routing node comprises a nanowire waveguide.

24. The optical signal router of claim 1, wherein each of the bi-directional optical switches comprise a planar dielectric photonic crystal including a lattice of holes having a first linear defect adjacent to a second linear defect separated by a central row of lattice holes, wherein the first linear defect in the lattice of holes forms a first single mode line defect waveguide, and the second linear defect in the lattice of holes forms a second single mode line defect waveguide, such that optical energy of one or more electromagnetic waves propagating within the first and/or second waveguides is selectively coupled between the first and second waveguides in that such optical energy is enabled to be partially or completely transferred between the first and second waveguides across the central row of lattice holes.

25. The optical signal router of claim 1, wherein the plurality of router input/output ports include N router input/output ports, where N is an integer equal to 4 or more, and the ways to interconnect the N router input/output ports are based on the following equation:

$$\prod_{i=0}^{(\frac{N}{2}-1)} (N-1-2i).$$

26. The optical signal router of claim 1, wherein each of the bi-directional optical switches of the optical routing nodes is selectable to simultaneously transmit optical signals of different optical signal paths between different selected pairs of the router input/output ports.

27. The optical signal router of claim 1,
wherein the plurality of router input/output ports comprises N router input/output ports, where N is an integer equal to 4 or more, and
wherein the plurality of optical routing nodes are configured to enable routing of an optical signal from any one of the N router input/output ports to any other of the remaining N−1 router input/output ports via a corresponding optical signal path through at least some of the bi-directional optical switches of the plurality of optical routing nodes.

28. The optical signal router of claim 27, wherein the plurality of optical routing nodes are configured to enable routing of the optical signal via a first optical signal path of the plural optical signal paths, the first optical signal path comprising at least a first bi-directional optical switch configured to transmit an optical signal without application of electrical power to the first bi-directional optical switch.

29. The optical signal router of claim 27, wherein the plurality of optical routing nodes are configured to enable routing of an optical signal via a first optical signal path of the plural optical signal paths, the first optical signal path through selective activation of at least some of the bi-directional optical switches of the plurality of optical routing nodes.

30. The optical signal router of claim 27, wherein the plurality of optical routing nodes are configured to enable routing of an optical signal via a first optical signal path of the plural optical signal paths, the first optical signal path extending between two of the N router input/output ports without application of electrical power to any part of the optical signal router.

31. The optical signal router of claim 1, wherein the plurality of optical routing nodes are configured to enable routing of an optical signal via a first optical signal path of the plural optical signal paths, the first optical signal path extending between two of the router input/output ports without application of electrical power to any part of the optical signal router.

32. The optical signal router of claim 1, wherein the plurality of optical routing nodes are configured to enable routing of an optical signal via a first optical signal path of the plural optical signal paths, the first optical signal path extending between two of the router input/output ports without application of electrical power to any bi-directional optical switch through which the first optical signal path extends.

33. The optical signal router of claim 1, wherein the optical signal router is configurable to provide the plural optical signal paths to include a plurality of the bi-directional optical switches without application of electrical power to at least some of the bi-directional optical switches of the optical signal paths.

34. The optical signal router of claim 1 connected for optical intra-chip communication.

35. The optical signal route of claim 1, wherein the optical routing nodes are configured to provide a bi-directional non-blocking interconnection fabric configured to provide a first optical signal path of the plural optical signal paths between any one of the plurality of router input/output ports to any other one of the router plurality of input/output ports in response to a corresponding selection or non-selection of each of the bidirectional optical switches.

36. The optical signal router of claim 35, wherein the first optical signal path is a bi-directional optical signal path.

37. The optical signal router of claim 1, wherein the array of optical routing nodes comprises at least a 2×2 array of first optical routing nodes, each first optical routing node directly connected to at least two other first optical routing nodes via two corresponding shared input/output waveguides, wherein a second closed loop optical signal path is formed by at least some of the shared input/output waveguides of the first optical routing nodes, the second closed loop optical signal path formed fully within the 2×2 array and extending through each of the first optical routing nodes of the 2×2 array.

38. The optical signal router of claim 37, wherein the second closed loop optical signal path comprises a bi-directional optical switch of each of the first optical routing nodes of the 2×2 array.

39. The optical signal router of claim 1,
wherein the array of optical routing nodes comprises a first optical routing node,
wherein the eight input/output waveguides corresponding to the first optical routing node comprise a first input/output waveguide and a second input/output waveguide, and
wherein the plurality of router input/output ports comprise a first bi-directional optical router port switch directly connected to the first bi-directional optical switch of a first optical routing node via the first input/output waveguide, and directly connected to the second bidirectional optical switch of the first optical routing node via the second input/output waveguide.

40. The optical signal router of claim 39, wherein the first bi-directional optical router port switch is configured to be connected to only a single external waveguide and to selectively transmit signals between the single external waveguide and a selected one of the one of the first input/output waveguide and the second input/output waveguide.

41. The optical signal router of claim 39, wherein the first bi-directional optical router port switch is configured to optically connect first optical energy between the single external waveguide and the first input/output waveguide while optically connecting second optical energy between the single external waveguide and the second input/output waveguide.

42. The optical signal router of claim 1, wherein at least a first router input/output port of the plurality of router input/output ports comprises a bi-directional optical switch configured to optically connect some optical energy between the corresponding external waveguide and a first input/output waveguide of a corresponding optical routing node while optically connecting other optical energy between the corresponding external waveguide and a second input/output waveguide of the corresponding optical routing node.

43. The optical signal router of claim 1, wherein at least a first router input/output port of the plurality of router input/output ports comprises a bi-directional optical switch configured to optically connect some optical energy between an external source and the array of optical routing nodes while optically connecting other optical energy between the external source and the array of optical routing nodes.

44. The optical signal router of claim 1, wherein one of the four bi-directional optical switches of an optical routing node of the array of optical routing nodes is configured to couple some optical energy of the corresponding first optical signal received via one of the first and second switch input/output ports to one of the third and fourth switch input/output ports while not coupling other optical energy of the first optical signal to the one of the third and fourth switch input/output ports.

* * * * *